(12) United States Patent
Atarashi et al.

(10) Patent No.: US 7,538,510 B2
(45) Date of Patent: May 26, 2009

(54) CONTROLLER FOR MOTOR

(75) Inventors: Hirofumi Atarashi, Wako (JP);
Hiroyuki Isegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 11/723,584

(22) Filed: Mar. 21, 2007

(65) Prior Publication Data
US 2007/0222405 A1 Sep. 27, 2007

(30) Foreign Application Priority Data
Mar. 22, 2006 (JP) ............................... 2006-078554

(51) Int. Cl.
*H02P 21/00* (2006.01)
(52) U.S. Cl. ...................... 318/494; 318/801; 318/809; 318/810; 318/811; 318/812
(58) Field of Classification Search ................. 318/494, 318/801, 805, 809, 810, 811, 812
See application file for complete search history.

(56) References Cited

U.S. PATENT DOCUMENTS

| | | | | |
|---|---|---|---|---|
| 4,305,031 | A | | 12/1981 | Wharton |
| 5,245,238 | A | | 9/1993 | Lynch et al. |
| 5,543,943 | A | * | 8/1996 | Hanyu et al. ................... 349/20 |
| 6,376,955 | B1 | * | 4/2002 | Arimitsu ...................... 310/114 |
| 6,563,246 | B1 | | 5/2003 | Kajiura et al. |
| 6,774,591 | B2 | * | 8/2004 | Arimitsu et al. ............. 318/154 |
| 6,879,125 | B2 | * | 4/2005 | Akatsu ........................ 318/495 |
| 2003/0062784 | A1 | * | 4/2003 | Arimitsu et al. ............. 310/112 |

FOREIGN PATENT DOCUMENTS

JP 2002-204541 7/2002

* cited by examiner

*Primary Examiner*—Rita Leykin
(74) *Attorney, Agent, or Firm*—Arent Fox LLP.

(57) ABSTRACT

A controller for a motor permits efficient energization control according to an operating condition of a motor without depending on a number of revolutions of the motor when operating a motor having two rotors disposed around a rotating shaft. The controller includes a voltage-between-terminals increaser which carries out at least one of first processing for increasing a voltage between terminals in which a rotor phase difference is changed by an actuator in a direction for reducing the magnetic fluxes of fields of the motor, second processing for increasing a voltage between terminals in which an output voltage of a DC power source is increased by a DC/DC converter, and third processing for increasing a voltage between terminals in which d-axis current is increased in the case where the magnitude of a resultant vector of a command value of a d-axis voltage and a command value of a q-axis voltage in the motor exceeds the radius of a target voltage circle.

12 Claims, 14 Drawing Sheets

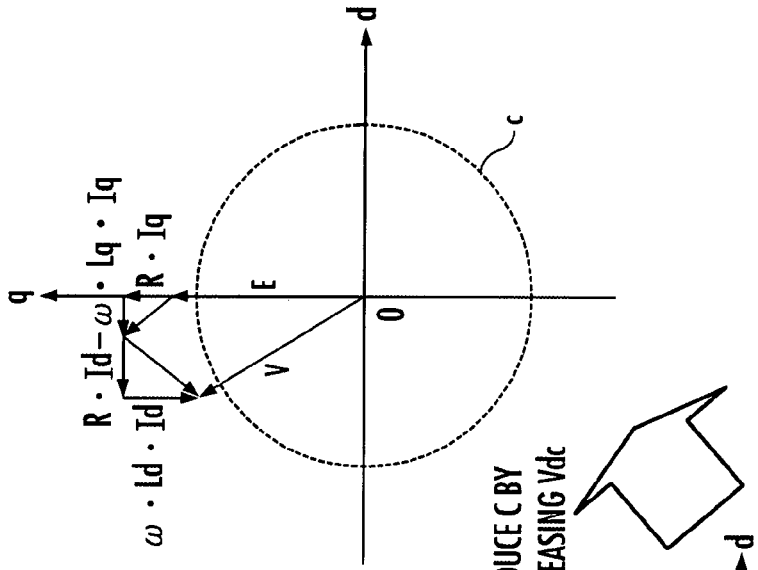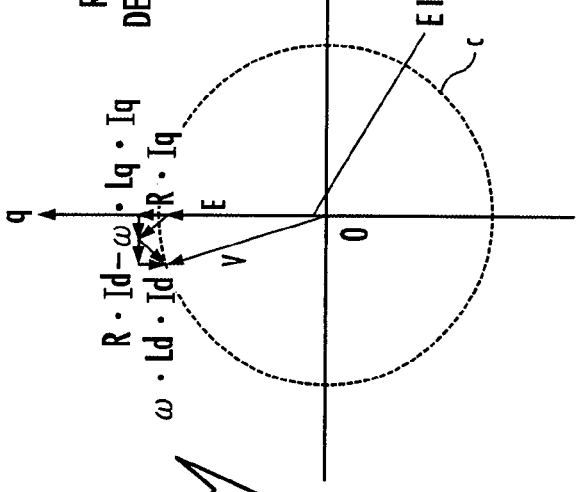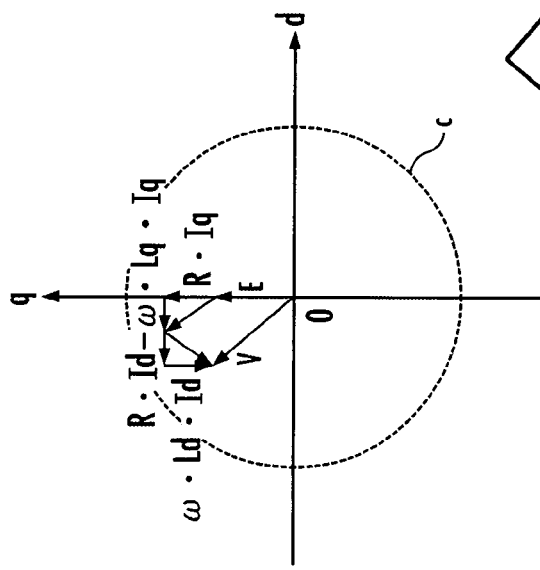
FIG. 9 (a), FIG. 9 (b), FIG. 9 (c)
STRENGTHENING FIELD BY REDUCING Θd
E INCREASES
REDUCE C BY DECREASING Vdc

CONTROLLER FOR MOTOR

BACKGROUND OF THE INVENTION

1. Field of the Invention

The present invention relates to a controller for a motor adapted to carry out field weakening control of a permanent magnet field type rotary motor by changing a phase difference between two rotors disposed around a rotating shaft.

2. Description of the Related Art

Hitherto, there has been known a permanent magnet field type rotary motor which is equipped with a first rotor and a second rotor concentrically provided around a rotating shaft thereof and which is adapted to conduct field weakening control by changing a phase difference between the first rotor and the second rotor according to a rotational velocity (refer to, for example, Japanese Patent Laid-Open Publication No. 2002-204541).

In such a conventional motor, the first rotor and the second rotor are connected through the intermediary of a member that is displaced in the radial direction when subjected to a centrifugal force. The motor is configured such that, when the motor is in a halting state, the magnetic poles of the permanent magnets disposed in the first rotor and the magnetic poles of the permanent magnets disposed in the second rotor are oriented in the same direction, providing maximum magnetic fluxes of the fields. As the rotational velocity of the motor increases, the phase difference between the first rotor and the second rotor increases due to a centrifugal force, thus reducing the magnetic fluxes of the fields.

FIG. 14 shows a range in which the field of the motor need to be weakened, the axis of ordinates indicating output torque Tr and the axis of abscissas indicating a number of revolutions N. In FIG. 14, a character "u" denotes an orthogonal line of the motor. The line u is formed by connecting the points at which a phase voltage of the motor becomes equal to a supply voltage, depending on a combination of the number of revolutions and an output torque when the motor is actuated without carrying out the field weakening control. A character X in the figure denotes a range in which the field weakening is not required, while a character Y denotes a range in which the field weakening is required.

As shown in FIG. 14, the range Y in which the field weakening is necessary is determined by the number of revolutions N and the output torque Tr of the motor. Hence, in the conventional field weakening control, which depends merely on the number of revolutions, a field weakening control amount tends to be inconveniently excessive or insufficient.

Basically, the field weakening control is carried out to reduce a back electromotive force produced in an armature by the revolution of the motor so as to restrain a voltage between terminals of the armature from becoming higher than a supply voltage, thereby allowing the motor to be used in a higher revolution range. When changing the phase difference between the first rotor and the second rotor by using the number of revolutions of the motor or a centrifugal force, only the number of revolutions is the parameter for changing the level of field weakening. This inconveniently prevents flexible changes of the controllable range of an output torque or a number of revolutions of the motor.

In a motor that operates also as a generator, the operating efficiency is generally improved by using different field control amounts for a driving mode (positive output torque) and a power generating mode (negative output torque), respectively, for the same number of revolutions. Furthermore, disadvantageously, the field control amount cannot be changed between the driving mode and the power generating mode when the phase difference between the first rotor and the second rotor is changed by the number of revolutions or a centrifugal force.

SUMMARY OF THE INVENTION

The present invention has been made with a view of the aforesaid background, and it is an object of the invention to provide a controller for a motor that is capable of accomplishing efficient energization control according to an operating state of the motor without depending on a number of revolutions of the motor when operating the motor, which has two rotors disposed around a rotating shaft.

To this end, according to the present invention, there is provided a controller for a motor adapted to control an operation of a permanent magnet field type rotary motor having a first rotor and a second rotor, which have a plurality of fields made of permanent magnets and which are disposed around a rotating shaft, by field control carried out by changing a rotor phase difference as the phase difference between the first rotor and the second rotor. The field control includes field weakening control for reducing the magnetic fluxes of fields of the motor and field strengthening control for increasing the magnetic fluxes of the fields of the motor.

A controller for a motor according to a first aspect of the present invention includes: an inverter circuit for converting DC power supplied from a DC power source into multiphase AC power to be supplied to an armature of the motor; a rotor phase difference changer for changing the rotor phase difference; a DC voltage changer for changing an output voltage of the DC power source; and a voltage-between-terminals increaser which carries out at least one of first processing for increasing a voltage between terminals to change the rotor phase difference in a direction for reducing the magnetic fluxes of fields of the motor by the rotor phase difference changer and second processing for increasing a voltage between terminals to increase an output voltage of the DC power source by the DC voltage changer in the case where the magnitude of a resultant vector of the voltages between terminals of armatures of individual phases of the motor exceeds a target voltage which has been set to be not more than an output voltage of the DC power source.

With this arrangement, if the magnitude of a resultant vector of voltages between terminals of armatures of individual phases of the motor exceeds the target voltage, then the amount of energization of the motor by the inverter circuit decreases and an output torque of the motor reduces accordingly. In this case, therefore, the voltage-between-terminals increaser carries out the first processing for changing the rotor phase difference in the direction for reducing the magnetic fluxes of the fields of the motor so as to reduce a back electromotive force of the motor, thus making it possible to increase the amount of energization of the motor. It is also possible to increase the amount of energization of the motor by carrying out the second processing for increasing a voltage between terminals for increasing an output voltage of the DC power source by the voltage-between-terminals increaser. The first processing for increasing a voltage between terminals and the second processing for increasing a voltage between terminals are carried out by the voltage-between-terminals increaser on the basis of the magnitude of a resultant vector of voltages between terminals in the motor rather than a number of revolutions of the motor. This makes it possible to efficiently operate the motor by securing a required amount of energization according to an operating condition of the motor.

Preferably, the voltage-between-terminals increaser carries out the first processing for increasing a voltage between terminals before the second processing for increasing a voltage between terminals if the magnitude of the resultant vector of the voltages between the terminals of the armatures of the individual phases of the motor exceeds the aforesaid target voltage, and thereafter carries out the second processing for increasing a voltage between terminals if the magnitude of the resultant vector of the voltages between the terminals of the armatures of the individual phases of the motor remains larger than the target voltage even after the first processing for increasing a voltage between terminals is carried out.

With this arrangement, in the case where the magnitude of the resultant vector of the voltages between the terminals of the armatures of the individual phases of the motor exceeds the target voltage, then the voltage-between-terminals increaser carries out the first processing for increasing a voltage between terminals first to reduce the magnetic fluxes of the fields of the motor. In the case where the first processing for increasing a voltage between terminals causes the magnitude of the resultant vector of the voltage between terminals in the motor to become the target voltage or lower, then the energization of the motor by the inverter circuit can be maintained. Meanwhile, in the case where the magnitude of the resultant vector of the voltage between terminals in the motor is still higher than the target voltage after the first processing for increasing a voltage between terminals is carried out, then the second processing for increasing a voltage between terminals is carried out to increase an output voltage of the DC power source so as to make it possible to further expand the operable range of the motor within which the motor can be energized by the inverter circuit.

Preferably, an operation of the motor is controlled on the basis of a predetermined torque command value, and the voltage-between-terminals increaser determines the order of execution of the first processing for increasing a voltage between terminals and the second processing for increasing a voltage between terminals on the basis of a change rate of the torque command value.

With this arrangement, the mechanical processing for changing the rotor phase difference by the rotor phase difference changer in the first processing for increasing a voltage between terminals takes longer to respond to a change command than the electrical processing does in the second processing for increasing a voltage between terminals, whereby an output voltage of the DC power source is changed by the DC voltage changer. For this reason, depending on a change rate of the torque command value, if, for example, the change rate is larger than a preset reference value, then the second processing for increasing a voltage between terminals, which requires a shorter response time, is carried out first, so that priority can be given to maintaining the amount of energization of the motor. In the case where the change rate is the reference value or less, then the first processing for increasing a voltage between terminals, which takes a longer response time, is carried out first, so that priority can be given to maintaining the operating efficiency of the motor.

Preferably, the voltage-between-terminals increaser determines the order of execution of the first processing for increasing a voltage between terminals and the second processing for increasing a voltage between terminals on the basis of the magnitude of a difference between the magnitude of the resultant vector of the voltages between the terminals of the armatures of individual phases of the motor and the target voltage.

With this arrangement, depending on the magnitude of a difference between the magnitude of the resultant vector of the voltages between terminals of the armatures of individual phases of the motor and the target voltage, if, for example, the difference is larger than a preset reference value, then the second processing for increasing a voltage between terminals, which requires a shorter response time, is carried out first, so that priority can be given to maintaining the amount of energization of the motor. In the case where the difference is the reference value or less, then the first processing for increasing a voltage between terminals, which takes a longer response time, is carried out first, so that priority can be given to maintaining the operating efficiency of the motor.

Preferably, the controller for a motor includes a rotor position detector which detects a position of the first rotor; and an energization control unit which handles the motor by converting the motor into an equivalent circuit based on a two-phase DC rotating coordinate system composed of a d-axis indicating the direction of a magnetic flux of a field and a q-axis orthogonal to the d-axis on the basis of the position of the first rotor and which controls the amount of energization of an armature disposed on each axis in the equivalent circuit thereby to control the energization of the motor, wherein the voltage-between-terminals increaser carries out at least one of the first processing for increasing a voltage between terminals, the second processing for increasing a voltage between terminals, and third processing for increasing a voltage between terminals whereby to increase the amount of energization of the armature disposed on the d-axis in the energization control in the case where the magnitude of a resultant vector of the voltages between terminals in the motor exceeds the target voltage.

With this arrangement, the voltage-between-terminals increaser carries out the third processing for increasing a voltage between terminals whereby to increase the amount of energization of the armature disposed on the d-axis in addition to the first processing for increasing a voltage between terminals and the second processing for increasing a voltage between terminals, thus making it possible to further reduce a back electromotive voltage produced in the motor. This allows the motor to be operated in a higher rotational range.

Preferably, the voltage-between-terminals increaser carries out the first processing for increasing a voltage between terminals and the second processing for increasing a voltage between terminals before the third processing for increasing a voltage between terminals in the case where the magnitude of the resultant vector of the voltages between the terminals in the motor exceeds the target voltage, and carries out the third processing for increasing a voltage between terminals in the case where the magnitude of the resultant vector of the voltages between the terminals in the motor remains larger than the target voltage even after the first processing for increasing a voltage between terminals and the second processing for increasing a voltage between terminals are carried out.

With this arrangement, in the case where the magnitude of the resultant vector of the voltages between the terminals in the motor exceeds the target voltage, then the voltage-between-terminals increaser carries out the first processing for increasing a voltage between terminals and the second processing for increasing a voltage between terminals before the third processing for increasing a voltage between terminals. This makes it possible to prevent the operating efficiency of the motor from being lowered due to an increase of the amount of energization of the d-axis armature by the third processing for increasing a voltage between terminals.

Preferably, an operation of the motor is controlled on the basis of a predetermined torque command value, and the voltage-between-terminals increaser determines the order of execution of the first processing for increasing a voltage between terminals, the second processing for increasing a voltage between terminals, and the third processing for increasing a voltage between terminals on the basis of a change rate of the torque command value.

With this arrangement, depending on a change rate of the torque command value, if, for example, the change rate is larger than a preset reference value, then the second processing for increasing a voltage between terminals or the third processing for increasing a voltage between terminals, which is electrical processing and requires a shorter response time, is carried out first, so that priority can be given to maintaining the amount of energization of the motor. In the case where the change rate is the reference value or less, then the first processing for increasing a voltage between terminals, whereby the amount of energization of the motor is reduced, although it is mechanical processing and takes a longer response time, is carried out first, so that priority can be given to maintaining the operating efficiency of the motor.

Preferably, the voltage-between-terminals increaser determines the order of execution of the first processing for increasing a voltage between terminals, the second processing for increasing a voltage between terminals, and the third processing for increasing a voltage between terminals on the basis of the magnitude of a difference between the magnitude of the resultant vector of the voltages between the terminals of the armatures of individual phases of the motor and the target voltage.

With this arrangement, depending on the magnitude of a difference between the magnitude of the resultant vector of the voltages between terminals of the armatures of individual phases of the motor and the target voltage, if, for example, the difference is larger than a preset reference value, then the second processing for increasing a voltage between terminals and the third processing for increasing a voltage between terminals, which require a shorter response time, are carried out first, so that priority can be given to maintaining the amount of energization of the motor. In the case where the difference is the reference value or less, then the first processing for increasing a voltage between terminals, which takes a longer response time, is carried out first, so that priority can be given to maintaining the operating efficiency of the motor.

A controller for a motor according to a second aspect of the present invention includes: an inverter circuit for converting DC power supplied from a DC power source into multiphase AC power to be supplied to an armature of the motor; a rotor phase difference changer for changing the rotor phase difference; a DC voltage changer for changing an output voltage of the DC power source; and a voltage-between-terminals decreaser which carries out at least one of first processing for decreasing a voltage between terminals to change the rotor phase difference in a direction for increasing the magnetic fluxes of fields of the motor by the rotor phase difference changer and second processing for decreasing a voltage between terminals to reduce an output voltage of the DC power source by the DC voltage changer in the case where the magnitude of a resultant vector of the voltages between terminals of armatures of individual phases of the motor becomes smaller than a target voltage which has been set to be not more than an output voltage of the DC power source.

With this arrangement, in the case where the magnitude of a resultant vector of voltages between the terminals of the armatures of individual phases of the motor becomes smaller than the target voltage, then power loss occurring when the DC power is converted into the multiphase AC power in the inverter circuit increases. In this case, therefore, the voltage-between-terminals decreaser carries out the first processing for decreasing a voltage between terminals by changing the rotor phase difference, so that the magnetic fluxes of the fields of the motor can be increased to raise the voltages between the terminals of the armatures of individual phases of the motor. This in turn makes it possible to reduce a difference between the magnitude of a resultant vector of the voltages between the terminals of the armatures of individual phases of the motor and the target voltage, thus permitting a reduction in the power loss in the inverter circuit.

An output voltage of the DC power source can be reduced by carrying out the second processing for decreasing a voltage between terminals by changing an output voltage of the DC power source by the voltage-between-terminals decreaser. This in turn makes it possible to reduce a difference between the magnitude of a resultant vector of the voltages between the terminals of the armatures of individual phases of the motor and the voltage of DC power supplied to the inverter circuit, thus permitting a reduction in the power loss in the inverter circuit. The first processing for decreasing a voltage between terminals and the second processing for decreasing a voltage between terminals are carried out by the voltage-between-terminals decreaser on the basis of the magnitude of a resultant vector of voltages between the terminals in the motor rather than a number of revolutions of the motor. Hence, it is possible to restrain deterioration in the operating efficiency of the motor according an operating condition of the motor.

Preferably, the voltage-between-terminals decreaser carries out the first processing for decreasing a voltage between terminals before the second processing for decreasing a voltage between terminals in the case where the magnitude of the resultant vector of the voltages between the terminals of the armatures of the individual phases of the motor becomes smaller than the aforesaid target voltage, and then carries out the second processing for decreasing a voltage between terminals in the case where the magnitude of the resultant vector of the voltages between the terminals of the armatures of the individual phases of the motor remains smaller than the target voltage even after the first processing for decreasing a voltage between terminals is carried out.

With this arrangement, in the case where the magnitude of the resultant vector of the voltages between the terminals of the armatures of the individual phases of the motor becomes smaller than the target voltage, then the voltage-between-terminals decreaser carries out the first processing for decreasing a voltage between terminals first to increase the magnetic fluxes of the fields of the motor. Executing the first processing for decreasing a voltage between terminals brings the magnitude of the resultant vector of the voltage between terminals in the motor close to the target voltage. This makes it possible to reduce power loss in the inverter circuit and to reduce the amount of energization of the motor.

Preferably, an operation of the motor is controlled on the basis of a predetermined torque command value, and the voltage-between-terminals decreaser determines the order of execution of the first processing for decreasing a voltage between terminals and the second processing for decreasing a voltage between terminals on the basis of a change rate of the torque command value.

With this arrangement, depending on a change rate of the torque command value, if, for example, the change rate is larger than a preset reference value, then the second processing for decreasing a voltage between terminals, which is electrical processing and requires a shorter response time, is carried out first, so that an operating condition of the inverter circuit can be promptly changed according to a change in an output torque of the motor. In the case where the change rate is the reference value or less, then the first processing for decreasing a voltage between terminals, which makes it possible to reduce the amount of energization of the motor although it is mechanical processing and takes a longer response time, is carried out first, so that the operating condition of the inverter circuit can be changed.

Preferably, the voltage-between-terminals decreaser determines the order of execution of the first processing for decreasing a voltage between terminals and the second processing for decreasing a voltage between terminals on the basis of the magnitude of a difference between the magnitude of the resultant vector of the voltages between the terminals of the armatures of individual phases of the motor and the target voltage.

With this arrangement, depending on the magnitude of a difference between the magnitude of the resultant vector of the voltages between terminals of the armatures of individual phases of the motor and the target voltage, if, for example, the difference is larger than a preset reference value, then the second processing for decreasing a voltage between terminals, which requires a shorter response time, is carried out first, so that an operating condition of the inverter circuit can be promptly changed according to a change in an output torque of the motor. In the case where the difference is the reference value or less, then the first processing for decreasing a voltage between terminals, which makes it possible to reduce the amount of energization of the motor although it takes a longer response time, is carried out first, so that an operating condition of the inverter circuit can be changed.

BRIEF DESCRIPTION OF THE DRAWINGS

FIGS. 9(a), 9(b), and 9(c) are explanatory diagrams of advantages obtained by strengthening fields and lowering a supply voltage;

DESCRIPTION OF THE PREFERRED EMBODIMENTS

Figure 1:
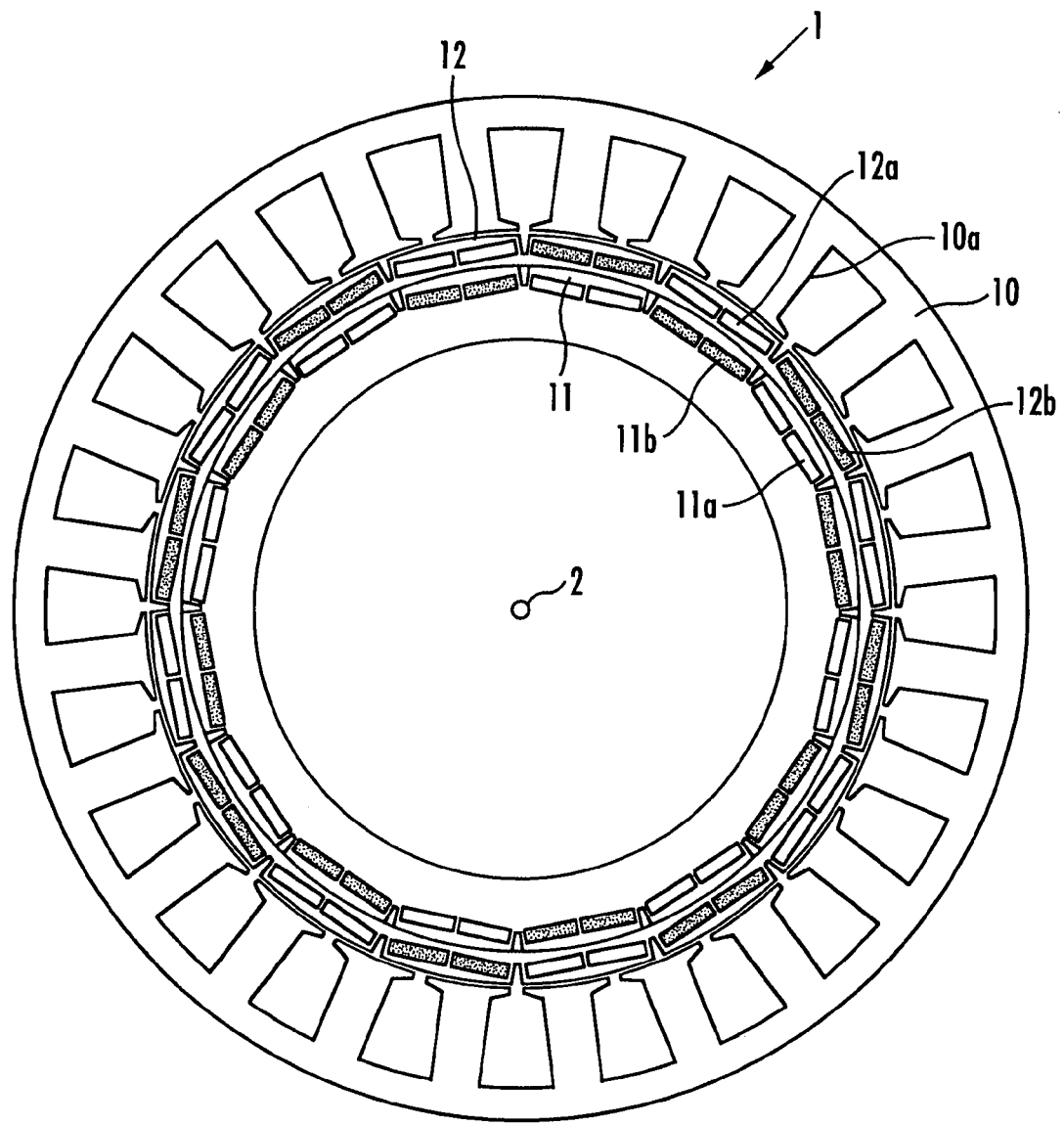
FIG. 1 is a configuration diagram of a DC brushless motor provided with a double-rotor.
Figure 2:
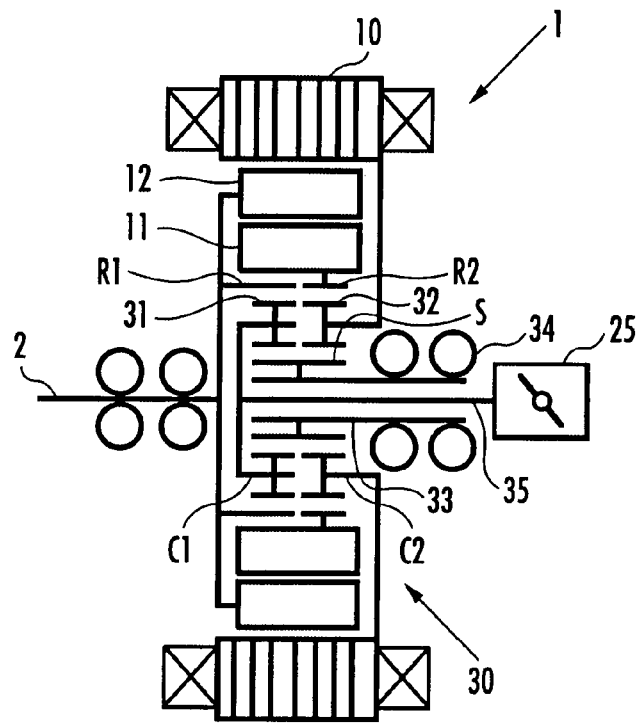
FIGS. 2(a) and 2(b) are a configuration diagram and an operation explanatory diagram, respectively, of a mechanism for changing a phase difference between an outer rotor and an inner rotor of the DC brushless motor shown in FIG. 1.
Figure 2:
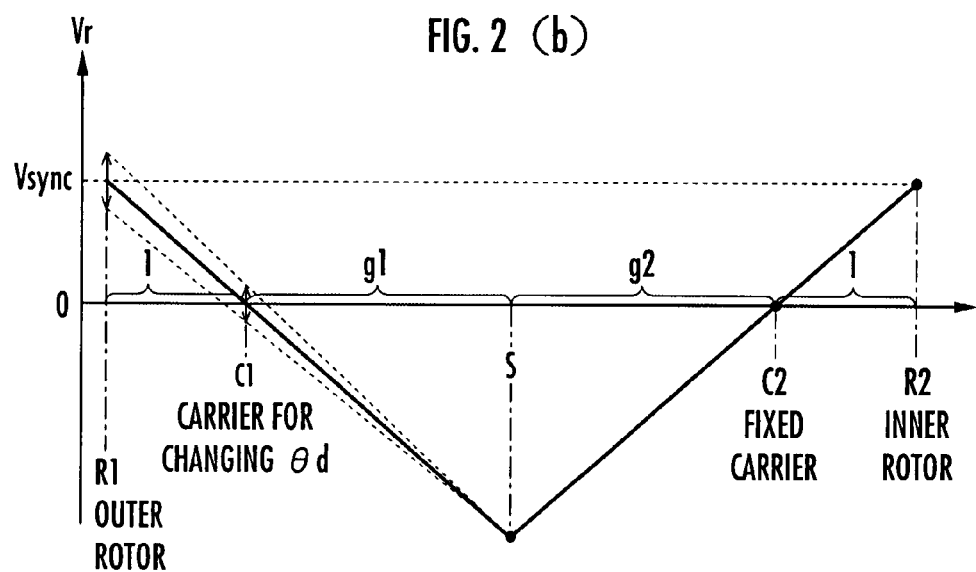
Figure 3:
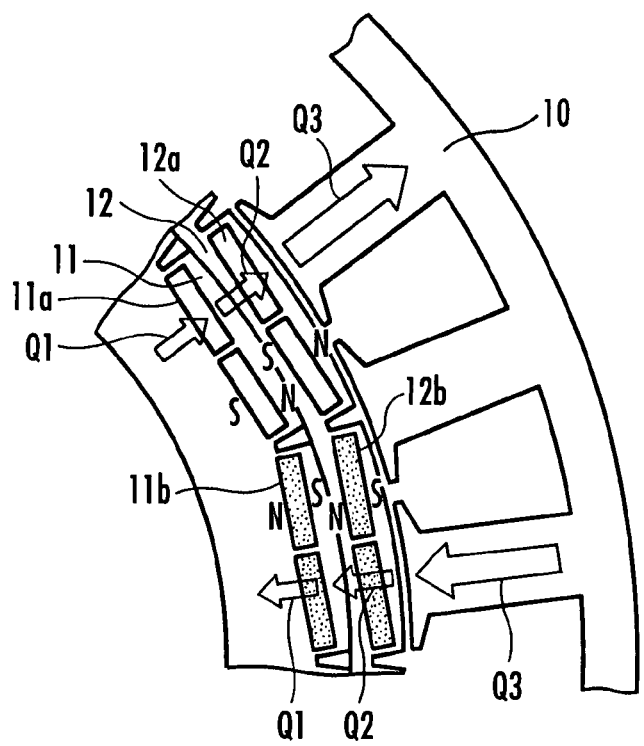
FIGS. 3(a) and 3(b) are explanatory diagrams of advantages provided by changing a phase difference between the outer rotor and the inner rotor.
Figure 3:
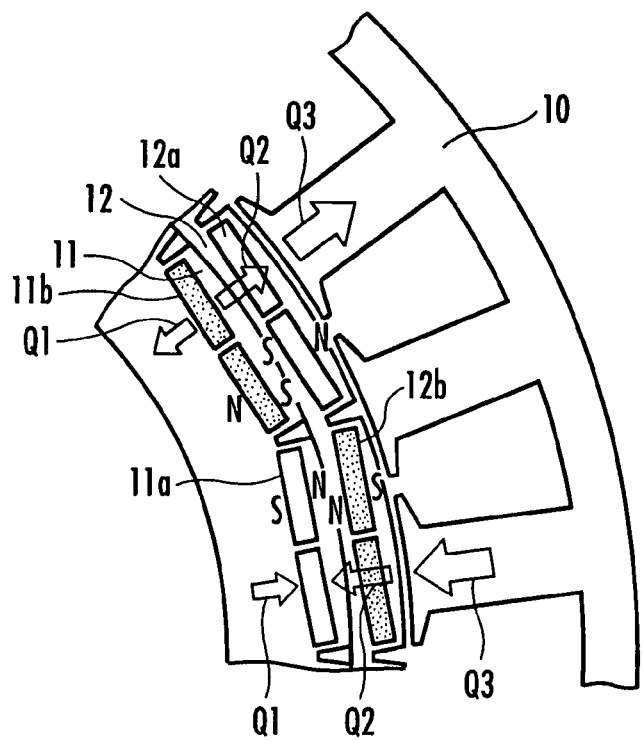
Figure 4:
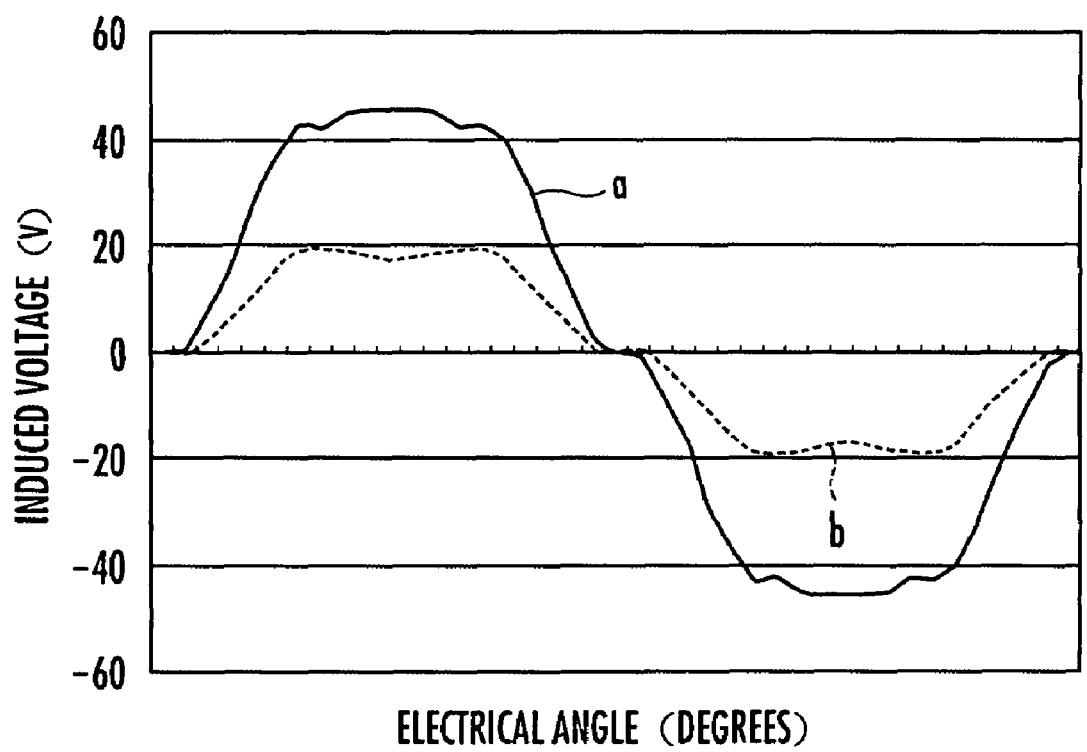
FIG. 4 is an explanatory diagram of the advantages provided by changing the phase difference between the outer rotor and the inner rotor.
Figure 5:
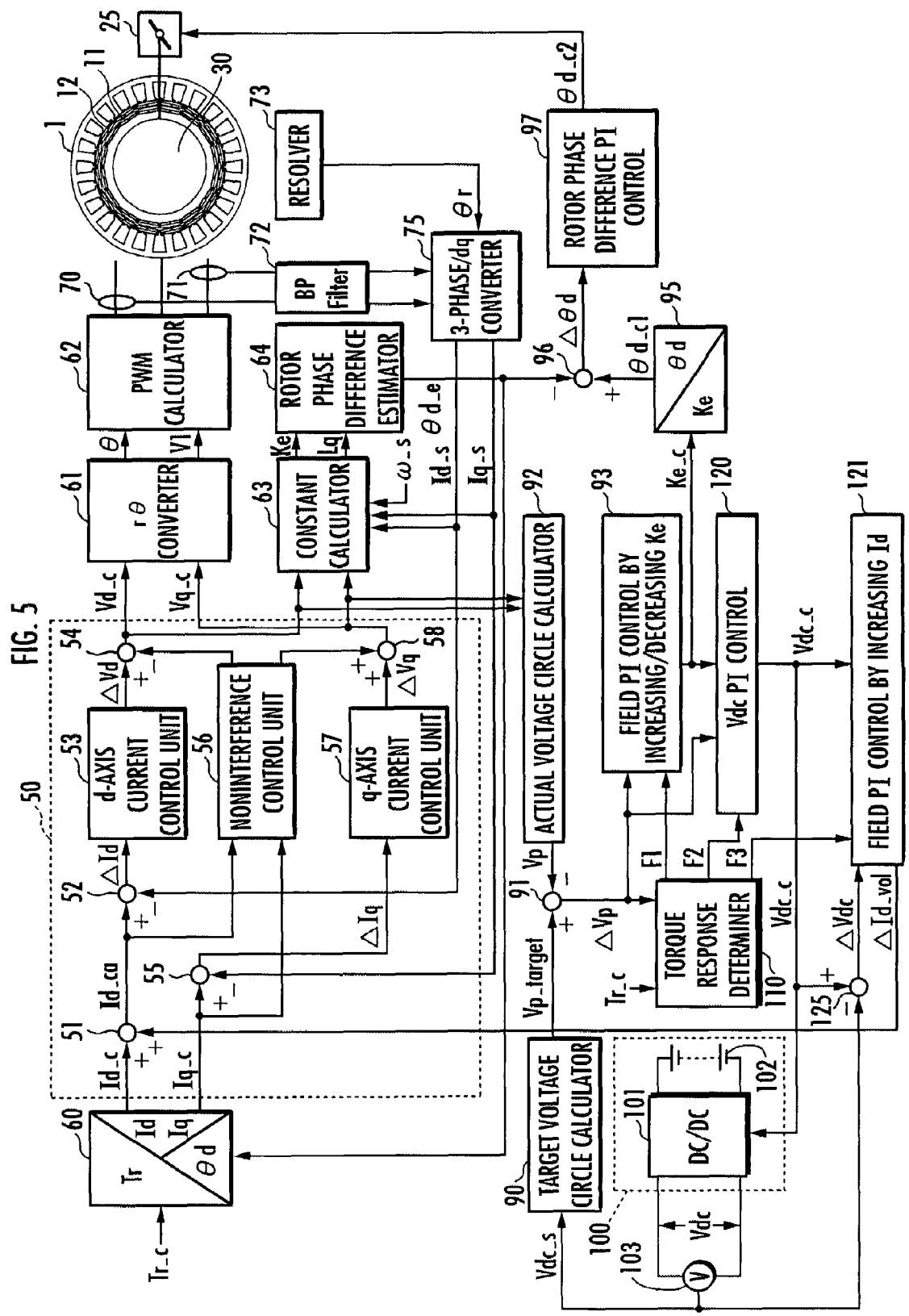
FIG. 5 is a control block diagram of a controller for a motor.
Figure 6:
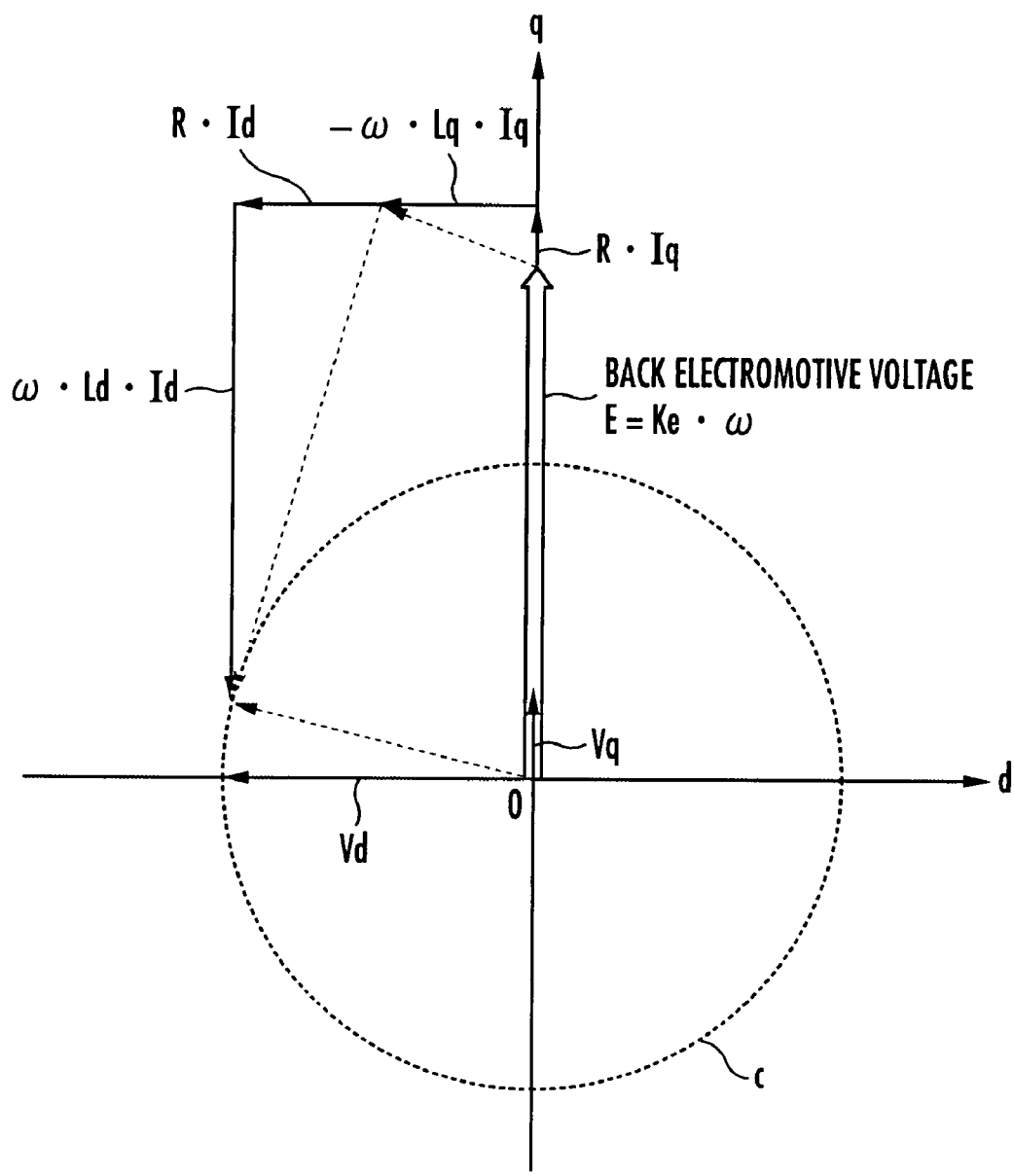
FIG. 6 is a voltage vector diagram in a d-q coordinate system.
Figure 7:
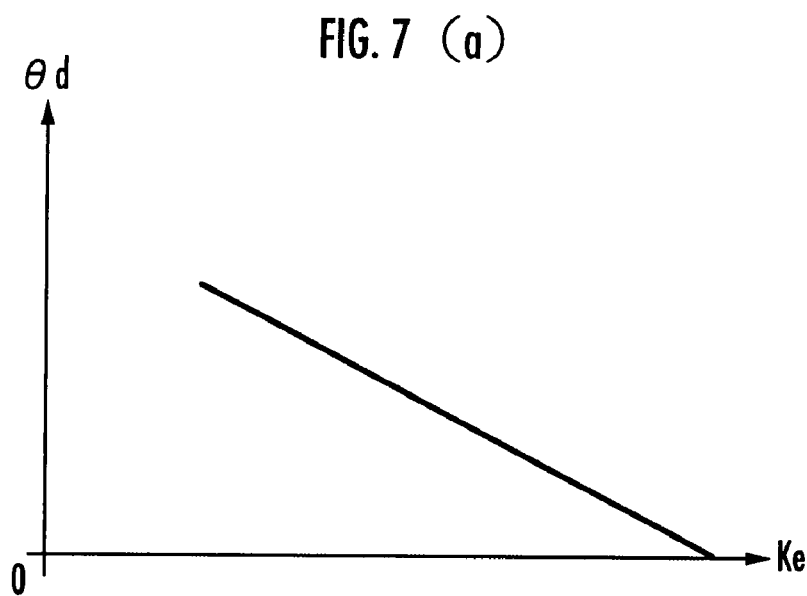
FIG. 7(a) is an explanatory diagram of a map for determining a rotor phase difference from an induced voltage constant.
FIG. 7(b) is a map for determining a rotor phase difference from an induced voltage constant and an inductance of a q-axis armature.
Figure 7:
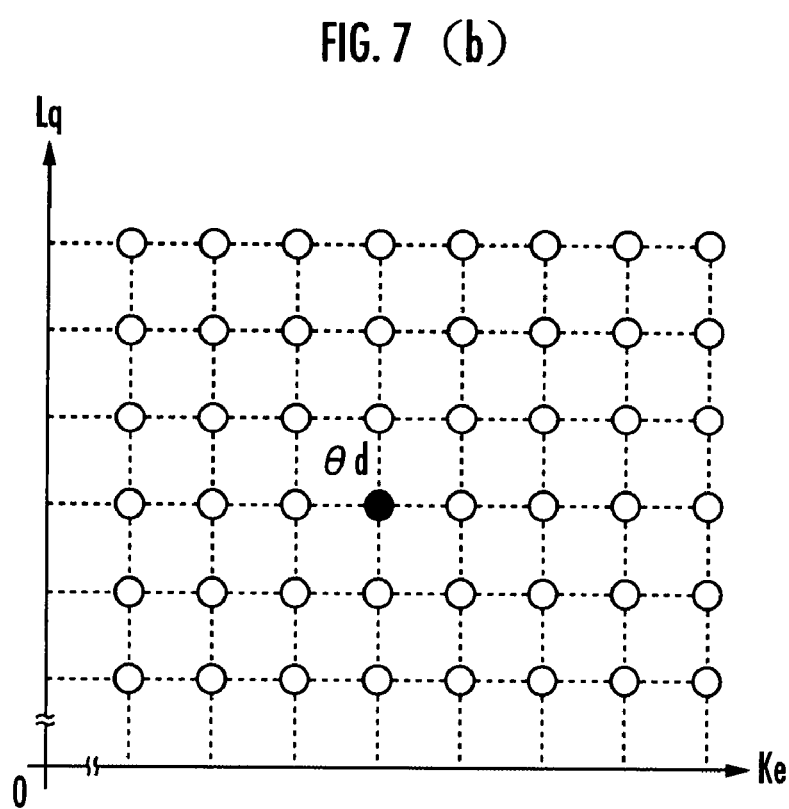
Figure 8:
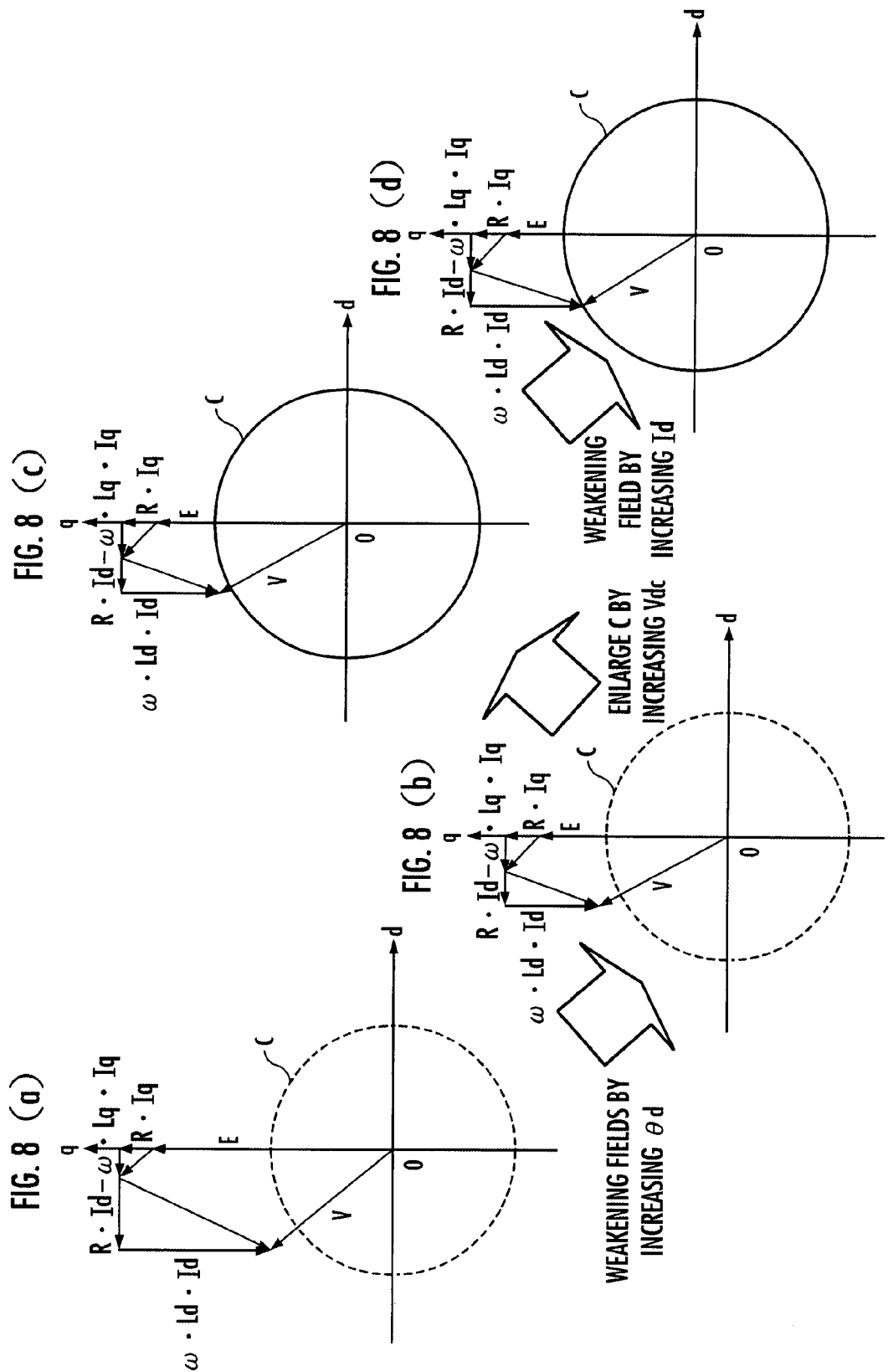
FIGS. 8(a), 8(b), 8(c), and 8(d) are explanatory diagrams of advantages obtained by weakening fields and increasing a supply voltage.
Figure 10:
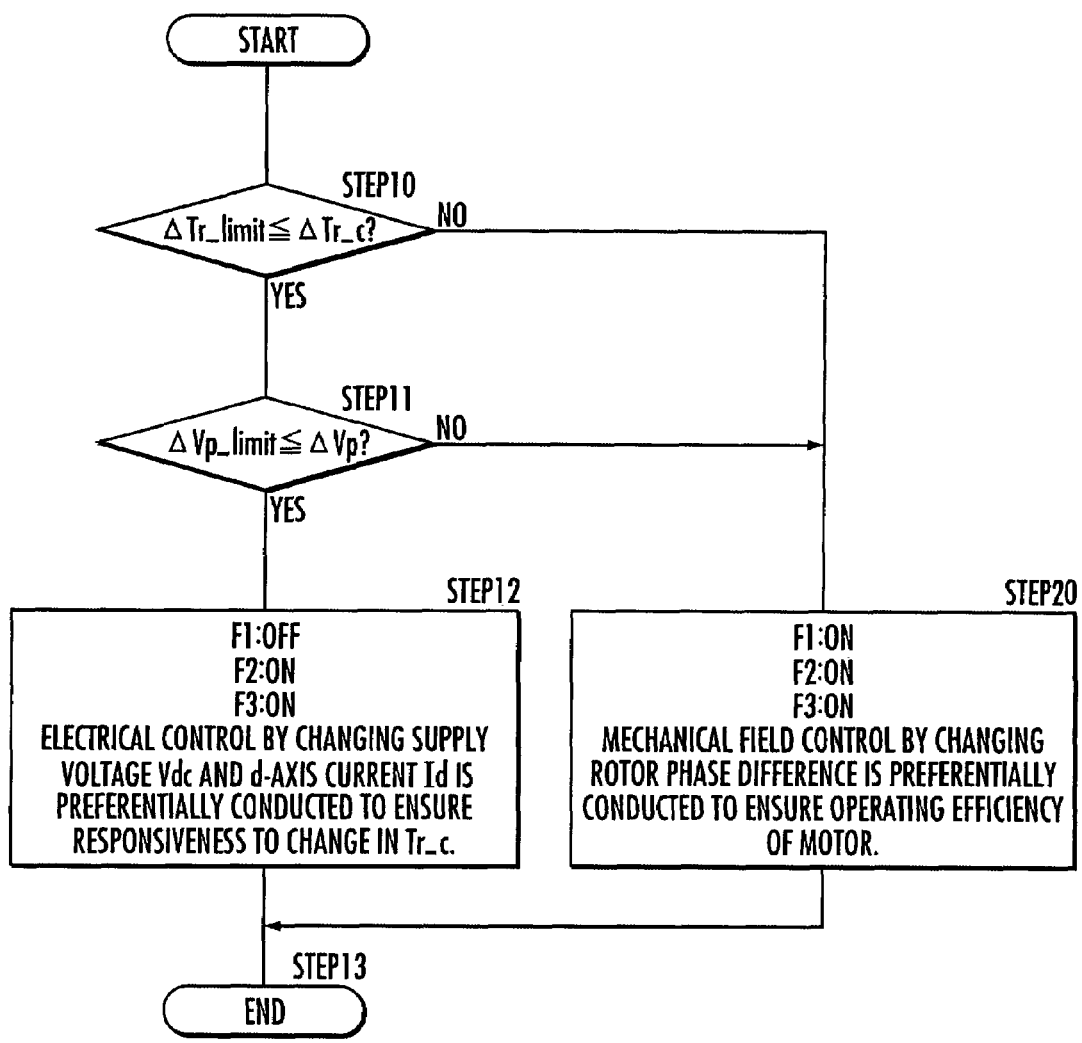
FIG. 10 is a flowchart of processing for determining the order of execution of processing for bringing a resultant vector of voltages between the terminals of the armatures of individual phases of the motor close to a target voltage circle.
Figure 11:
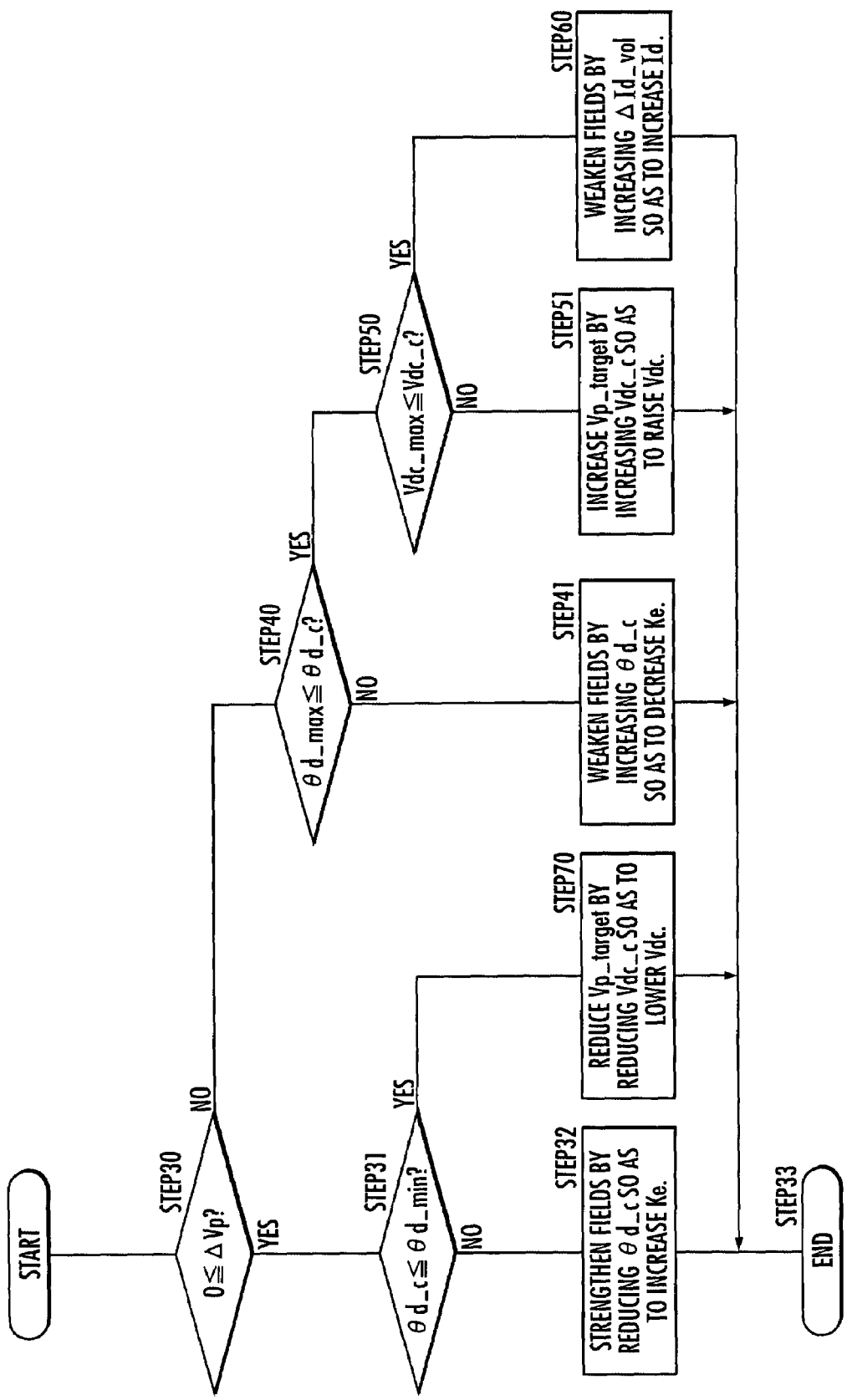
FIG. 11 is a flowchart of processing for bringing a resultant vector of voltages between the terminals of the armatures of individual phases of the motor close to a target voltage circle.
Figure 12:
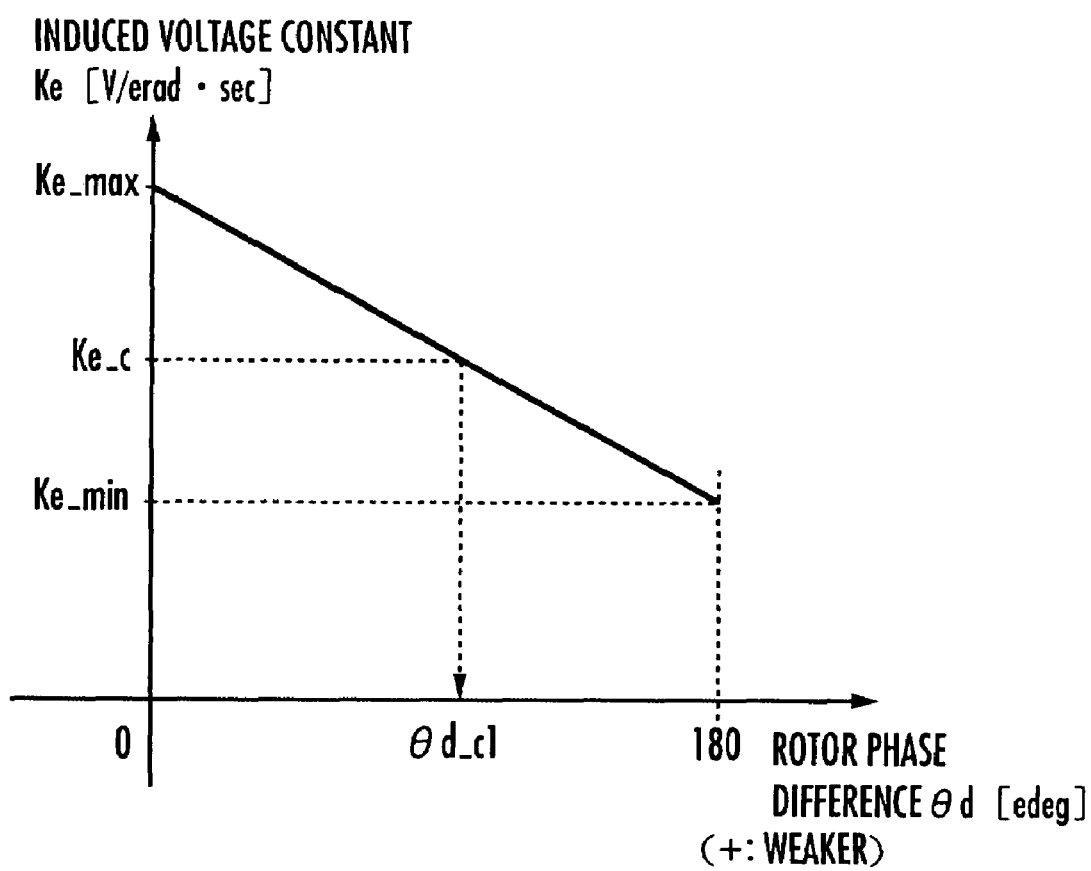
FIG. 12 is an explanatory diagram of a map for determining a rotor phase difference from an induced voltage constant.
Figure 13:
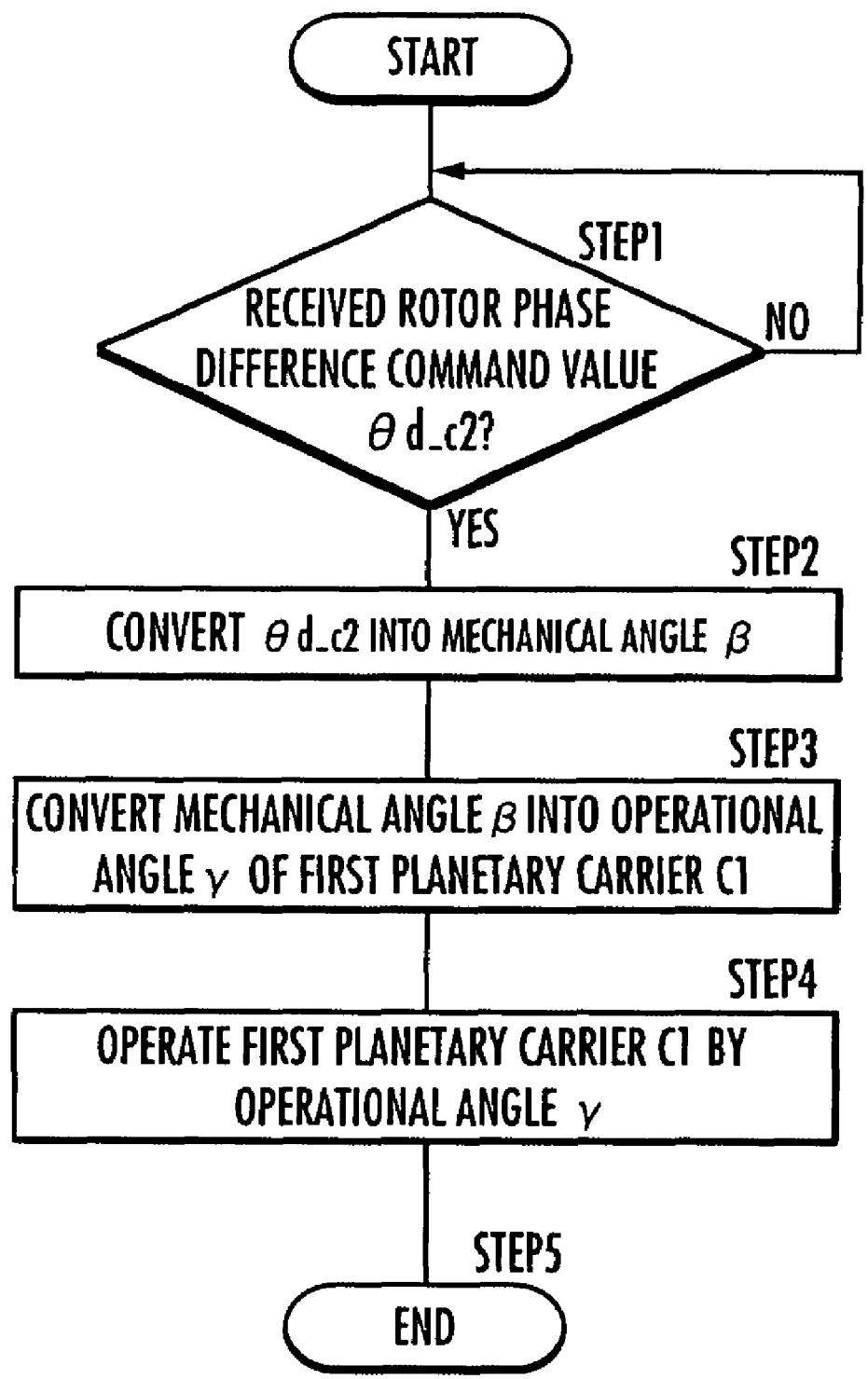
FIG. 13 is a flowchart of the processing for changing a rotor phase difference by an actuator.
Figure 14:
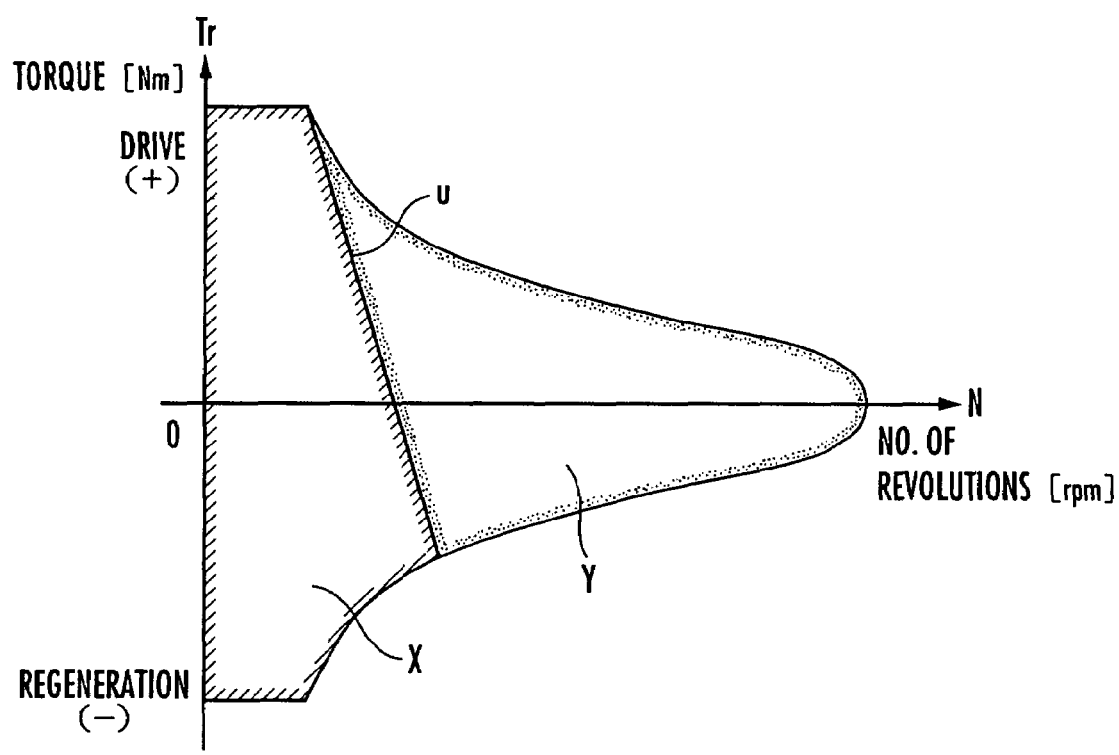
FIG. 14 is an explanatory diagram showing a range in which field weakening in the motor is required.

An embodiment of the present invention will be explained with reference to FIG. 1 to FIG. 13. FIG. 1 is a configuration diagram of a DC brushless motor provided with a double rotor, FIGS. 2(a) and 2(b) are a configuration diagram and an operation explanatory diagram, respectively, of a mechanism for changing a phase difference between an outer rotor and an inner rotor of the DC brushless motor shown in FIG. 1, FIG. 3 and FIG. 4 are explanatory diagrams of advantages provided by changing a phase difference between the outer rotor and the inner rotor, FIG. 5 is a control block diagram of a controller for a motor, FIG. 6 is a voltage vector diagram in a d-q coordinate system, FIG. 7 shows explanatory diagrams of a map for determining a rotor phase difference from an induced voltage constant and a map for determining a rotor phase difference from an induced voltage constant and an inductance of a q-axis armature, FIG. 8 shows explanatory diagrams of advantages obtained by weakening a field and increasing a supply voltage, FIG. 9 shows explanatory diagrams of advantages obtained by strengthening a field and decreasing a supply voltage, FIG. 10 is a flowchart of processing for determining the order of execution of processing for bringing a resultant vector of voltages between the terminals of armatures of individual phases of the motor close to a target voltage circle, FIG. 11 is a flowchart of processing for bringing a resultant vector of voltages between the terminals of armatures of individual phases of the motor close to a target voltage circle, FIG. 12 is an explanatory diagram of a map for determining a rotor phase difference from an induced voltage constant, and FIG. 13 is a flowchart of processing for changing a rotor phase difference by an actuator.

Referring to FIG. 1, a motor 1 in the present embodiment is a DC brushless motor equipped with an inner rotor 11 (corresponding to a second rotor in the present invention) having fields of permanent magnets 11a and 11b disposed at equal intervals in the circumferential direction, an outer rotor 12 (corresponding to a first rotor in the present invention) having fields of permanent magnets 12a and 12b disposed at equal intervals in the circumferential direction, and a stator 10 having an armature 10a for producing rotary fields in relation to the inner rotor 11 and the outer rotor 12. The motor 1 is used as a driving source of, for example, a hybrid vehicle or an electric-powered vehicle, and operates as a motor and a generator when mounted in a hybrid vehicle.

The inner rotor 11 and the outer rotor 12 are concentrically disposed such that the rotating shafts thereof are both coaxial with a rotating shaft 2 of the motor 1. In the inner rotor 11, the permanent magnets 11a having their north poles facing the rotating shaft 2 and permanent magnets 11b having their south poles facing the rotating shaft 2 are alternately disposed. Similarly, in the outer rotor 12, the permanent magnets 12a having their north poles facing the rotating shaft 2 and the permanent magnets 12b having their south poles facing the rotating shaft 2 are alternately disposed.

The motor 1 further includes a planetary gear mechanism 30 shown in FIG. 2(a) to change a rotor phase difference, which is a phase difference between the outer rotor 12 and the inner rotor 11. Referring to FIG. 2(a), the planetary gear mechanism 30 is a single-pinion planetary gear mechanism disposed in a hollow portion of the inner rotor 11 on the inner circumferential side thereof. The planetary gear mechanism 30 includes a first ring gear R1 coaxially and integrally formed with the outer rotor 12, a second ring gear R2 coaxially and integrally formed with the inner rotor 11, a first planetary gear 31 engaging with the first ring gear R1, a second planetary gear 32 engaging with the second ring gear R2, a sun gear S, which is an idle gear engaging with the first planetary gear 31 and the second planetary gear 32, a first planetary carrier C1 which rotatively supports the first planetary gear 31 and which is rotatively supported by the rotating shaft 2, and a second planetary carrier C2 which rotatively supports the second planetary gear 32 and which is secured to the stator 10.

In the planetary gear mechanism 30, the first ring gear R1 and the second ring gear R2 have approximately the same gear configuration, and the first planetary gear 31 and the second planetary gear 32 have approximately the same gear configuration. The rotating shaft 33 of the sun gear S is coaxially disposed with the rotating shaft 2 of the motor 1 and rotatively supported by a bearing 34. Thus, the planetary gear mechanism 30 is configured such that the first planetary gear 31 and the second planetary gear 32 engage with the sun gear S, and the outer rotor 12 and the inner rotor 11 rotate in synchronization.

Further, a rotating shaft 35 of the first planetary carrier C1 is coaxially disposed with the rotating shaft 2 of the motor 1 and connected to an actuator 25. The second planetary carrier C2 is secured to the stator 10.

The actuator 25 hydraulically causes the first planetary carrier C1 to rotate in a forward direction or a reverse direction or restricts the rotation of the first planetary carrier C1 about the rotating shaft 2 in response to a control signal input from an external source. Then, as the first planetary carrier C1 is rotated by the actuator 25, a relative positional relationship (phase difference) between the outer rotor 12 and the inner rotor 11 changes. The planetary gear mechanism 30 and the actuator 25 constitute the rotor phase difference changer in the present invention. The actuator 25 may be an actuator that electrically rotates the first planetary carrier C1 rather than hydraulically.

FIG. 2(b) shows a relationship among the rotational velocities of the first ring gear R1, the first planetary carrier C1, the sun gear S, the second planetary carrier C2, and the second ring gear R2 in the planetary gear mechanism 30, the axis of ordinates indicating a rotational velocity Vr.

Referring to FIG. 2(b), the velocity of the second planetary carrier C2 secured to the stator 10 is zero. This means that, for example, when the sun gear S rotates in the reverse direction (Vr<0), the second ring gear R2 and the inner rotor 11 rotate in the forward rotational direction (Vr>0) at a velocity based on a gear ratio g2 relative to the second ring gear R2.

If the actuator 25 is not in operation (if the first planetary carrier C1 is not being rotated by the actuator 25), then the rotational velocity of the first planetary carrier C1 is zero. Hence, the first ring gear R1 and the outer rotor 12 rotate in the reverse direction relative to the rotating sun gear S at a velocity based on the gear ratio g1 of the sun gear S relative to the first ring gear R1. The gear ratio g1 and the gear ratio g2 are set to be approximately the same (g1≈g2), so that the inner rotor 11 and the outer rotor 12 rotate in synchronization, thus maintaining the phase difference between the inner rotor 11 and the outer rotor 12 at a constant value.

If the actuator 25 is in operation (if the first planetary carrier C1 is being rotated by the actuator 25), then the first ring gear R1 and the outer rotor 12 rotate in the reverse direction relative to the rotating sun gear S at a velocity obtained by increasing or decreasing a velocity based on the gear ratio g1 of the sun gear S relative to the first ring gear R1 by the rotational amount of the first planetary carrier C1. This changes the phase difference between the outer rotor 12 and the inner rotor 11.

The actuator 25 is constructed so as to be capable of rotating the first planetary carrier C1 in the forward direction or the reverse direction by at least a mechanical angle β (degrees)= (180/P)×g1/(1+g1) relative to the gear ratio g1 of the sun gear S with respect to the first ring gear R1 and the number of pairs of poles P of the motor 1.

Therefore, the phase difference between the outer rotor 12 and the inner rotor 11 can be changed toward an advance angle or a delay angle within the range of at least 180 degrees in terms of electrical angle. The motor 1 can be set, as appropriate, between a field weakening mode wherein the permanent magnets 12a and 12b of the outer rotor 12 and the permanent magnets 11a and 11b of the inner rotor 11 are disposed with the same poles thereof opposing each other and a field strengthening mode wherein the permanent magnets 12a and 12b of the outer rotor 12 and the permanent magnets 11a and 11b of the inner rotor 11 are disposed with opposite poles thereof facing against each other.

FIG. 3(a) shows the field strengthening mode. The directions of magnetic fluxes Q2 of the permanent magnets 12a and 12b of the outer rotor 12 and the directions of magnet fluxes Q1 of the permanent magnets 11a and 11b of the inner rotor 11 are the same, leading to a large composite magnetic fluxes Q3. Meanwhile, FIG. 3(b) shows the field weakening mode. The directions of the magnetic fluxes Q2 of the permanent magnets 12a and 12b of the outer rotor 12 and the directions of the magnet fluxes Q1 of the permanent magnets 11a and 11b of the inner rotor 11 are opposite to each other, causing the composite magnetic fluxes Q3 to be smaller.

FIG. 4 shows a graph comparing induced voltages produced in an armature of the stator 10 when the motor 1 is run at a predetermined number of revolutions in the mode shown in FIG. 3(a) and in the mode shown in FIG. 3(b), respectively, the axis of ordinates indicating induced voltage (V) and the axis of abscissas indicating electrical angle (degrees). In the graph, "a" denotes the mode shown in FIG. 3(a)(the field strengthening mode), while "b" denotes the mode shown in FIG. 3(b)(the field weakening mode). FIG. 4 shows that changing the phase difference between the outer rotor 12 and the inner rotor 11 causes a significant change in an induced voltage that is generated.

Thus, the induced voltage constant Ke of the motor 1 can be changed by increasing or decreasing the magnetic fluxes of the fields by changing the phase difference between the outer rotor 12 and the inner rotor 11. This makes it possible to expand an operative range relative to outputs and the numbers of revolutions of the motor 1, as compared with a case where the induced voltage constant Ke is fixed. Moreover, the operating efficiency of the motor 1 can be enhanced, because the copper loss of the motor 1 reduces, as compared with a case where the field weakening control is conducted by energizing the armature disposed on the d-axis (field axis) by d-q coordinate conversion, which is commonly used for controlling a motor.

Referring now to FIG. 5 to FIG. 13, the controller for a motor in accordance with the present invention will be explained. The controller for a motor shown in FIG. 5 (hereinafter referred to simply as "the controller") handles the motor 1 by converting the motor 1 into an equivalent circuit based on a two-phase DC rotating coordinate system in which the direction of field is indicated by the d-axis, while the direction that is orthogonal to the d-axis is indicated by the q-axis. The controller controls the amount of energization of the motor 1 such that torque based on a torque command value Tr_c received from an external source is output from the motor 1.

The controller is an electronic unit composed of a CPU, memories and the like, and includes a current command value determiner 60 which determines a command value Id_c of a current to be supplied to the armature on the d-axis (hereinafter referred to as "the d-axis current" and "the d-axis armature," respectively) and a command value Iq_c of a current to be supplied to the armature on the q-axis (hereinafter referred to as "the q-axis current" and "the q-axis armature," respectively) on the basis of a torque command value Tr_c and an estimated value θd_e of a phase difference between the outer rotor 12 and the inner rotor 11 (rotor phase difference) of the motor 1, a three-phase/dq converter 75 which calculates a d-axis current detection value Id_s and a q-axis current detection value Iq_s by three-phase/dq conversion on the basis of current detection signals which are detected by current sensors 70 and 71 and from which unwanted components have been removed by a band-pass filter 72 and a rotor angle θr of the outer rotor 12 detected by a resolver 73 (corresponding to the rotor position detecting means in the present invention), an energization control unit 50 (corresponding to the energization controlling means in the present invention) which determines a command value Vd_c of a voltage between the terminals of the d-axis armature (hereinafter referred to as "the d-axis voltage") and a command value Vq_c of a voltage between the terminals of the q-axis armature (hereinafter referred to as "the q-axis voltage") such that a difference ΔId between the command value Id_c and the detection value Id_s of the d-axis current and a difference ΔIq between the command value Iq_c and the detection value Iq_s of the q-axis current are reduced, an rθ converter 61 which converts the command value Vd_c of the d-axis voltage and the command value Vq_c of the q-axis voltage into components of a magnitude V1 and an angle θ, and a PWM calculator 62 which converts the components of the magnitude V1 and the angle θ into a three-phase (U, V, W) AC voltage by PWM control, the PWM calculator 62 including a function of the inverter circuit in the present invention.

The controller is further equipped with a constant calculator 63 which calculates the induced voltage constant Ke of the motor 1 and the inductance Lq of the q-axis armature on the basis of the d-axis voltage command value Vd_c, the q-axis voltage command value Vq_c, the d-axis current detection value Id_s, the q-axis current detection value Iq_s, and an angular velocity detection value ω_s of the motor 1 (detected by an angular velocity detector, which is not shown), a rotor phase difference estimator 64 which determines an estimated value θd_e of the rotor phase difference on the basis of the induced voltage constant Ke and the q-axis armature inductance Lq, a target voltage circle calculator 90 which calculates a radius Vp_target of a target voltage circle, which will be discussed later, from an output voltage Vdc of a DC power source 100 supplying DC power to the PWM calculator 62, an actual voltage circle calculator 92 which calculates a radius Vp of an actual voltage circle, which will be discussed later, from a d-axis voltage command value Vd_c and a q-axis voltage command value Vq_c, an induced voltage constant command value determiner 93 which determines a command value Ke_c of an induced voltage constant on the basis of a difference ΔVp between Vp_target and Vp, a rotor phase difference acquirer 95 which acquires a rotor phase difference θd_c1 associated with an induced voltage constant command value Ke_c, and a rotor phase difference command value determiner 97 which determines a rotor phase difference command value θd_c2 on the basis of a difference Δθd between the θd_c1 and the estimated value θd_e of a rotor phase difference.

The controller further includes a DC voltage command value determiner 120 which determines an output voltage command value Vdc_c of a DC power source 100 on the basis of the difference ΔVp between Vp_target and Vp and the induced voltage constant command value Ke_c, a field weakening current correction value calculator 121 which calculates a field weakening current correction value ΔId_vol on the basis of the output voltage command value Vdc_c and the difference between the Vdc_c calculated by a subtractor 125 and an output voltage Vdc of the DC power source 100 detected by a voltage sensor 103, and a torque response determiner 110 which determines the timings of actuating the induced voltage constant command value determiner 93, the DC voltage command value determiner 120, and the field weakening current correction value calculator 121 on the basis of the torque command value Tr_c and the difference ΔVp between Vp_target and Vp.

The DC power source 100 is composed of a battery 102 and a DC/DC converter 101. The DC/DC converter 101 corresponds to the DC voltage changing means in the present invention. Further, the voltage sensor 103, the target voltage circle calculator 90, the actual voltage circle calculator 92, the subtractor 91, the torque response determiner 110, the induced voltage constant command value determiner 93, the DC voltage command value determiner 120, the field weakening current correction value calculator 121, an adder 51, the rotor phase difference acquirer 95, a subtractor 96, and the rotor phase difference command value determiner 97 constitute the voltage-between-terminals increasing means and the voltage-between-terminals reducing means in the present invention.

The energization control unit 50 includes the adder 51 which adds a correction value ΔId_vol to the d-axis current command value Id_c, a subtractor 52 which calculates a difference ΔId between the d-axis current command value Id_ca to which the correction value ΔId_vol has been added and a detection value Id_s of the d-axis current, a d-axis current control unit 53 which calculates a d-axis difference voltage ΔVd for producing the difference ΔId, a noninterference control unit 56 which calculates a component (noninterference component) for canceling the influences of velocity electromotive forces, which interfere with each other between the d-axis and the q-axis, on the basis of the d-axis current command value Id_c and the q-axis current command value Iq_c, a subtractor 54 which subtracts the noninterference component calculated by the noninterference control unit 56 from the d-axis difference voltage ΔVd, a subtractor 55 which calculates the difference ΔIq between the command value Iq_c and the detection value Iq_s of the q-axis current, a q-axis current control unit 57 which calculates a q-axis difference voltage ΔVq for producing the difference ΔIq, and an adder 58 which adds the noninterference component to the q-axis difference voltage ΔVq.

FIG. 6 shows a relationship between current and voltage in the d-q coordinate system, the axis of ordinates indicating the q-axis (torque axis) and the axis of abscissas indicating the d-axis (field axis). In the figure, C denotes a target voltage circle whose radius Vp_target (corresponding to a target voltage in the present invention) is calculated by the target voltage circle calculator 90. Vp_target is set to, for example, Vdc×0.5 or Vdc/6$^{1/2}$ based on a sinusoidal modulation.

The controller controls the rotor phase difference of the motor 1, an output voltage of the DC power source 100, and the d-axis current such that the resultant vector V of the voltage Vd between the terminals of the d-axis armature and the voltage Vq between the terminals of the q-axis armature (the magnitude of the resultant vector V providing the radius of an actual voltage circle) traces the circumference of the target voltage circle C. In the figure, E denotes a back electromotive force generated in the q-axis armature by the revolution of the motor 1, ω denotes an angular velocity of the motor 1, R denotes resistance of the d-axis armature and the q-axis armature, Lq denotes an inductance of the q-axis armature, Ld denotes an inductance of the d-axis armature, Vd denotes a d-axis voltage, Vq denotes a q-axis voltage, Id denotes d-axis current, and Iq denotes q-axis current.

Regarding the components on the q-axis shown in FIG. 6, the relationship indicated by expression (1) given below holds; therefore, the induced voltage constant Ke of the motor 1 can be calculated from expression (2) given below:

$$Ke \cdot \omega + R \cdot Iq = Vq - \omega \cdot Ld \cdot Id \quad (1)$$

where Ke: Induced voltage constant; ω: Angular velocity of motor; R: Resistance of q-axis armature and d-axis armature; Iq: q-axis current; Vq: Voltage between terminals of q-axis armature; Ld: Inductance of d-axis armature; and Id: d-axis current.

$$Ke = \frac{Vq - \omega \cdot Ld \cdot Id - R \cdot Iq}{\omega} \quad (2)$$

Regarding the components on the d-axis shown in FIG. 6, the relationship indicated by expression (3) given below holds; therefore, the inductance Lq of the q-axis armature can be calculated from expression (4) given below:

$$Vd = R \cdot Id - \omega \cdot Lq \cdot Iq \quad (3)$$

$$Lq = \frac{R \cdot Id - Vd}{\omega \cdot Iq} \quad (4)$$

The constant calculator 63 substitutes the q-axis command voltage Vq_c, the angular velocity detection value ω_s of the motor 1, the d-axis current detection value Id_s, and the q-axis current detection value Iq_s into Vq, ω, Id and Iq, respectively, of the above expression (2) to calculate the induced voltage constant Ke. The constant calculator 63 also substitutes the d-axis current detection value Id, the d-axis voltage command value Vd_c, the angular velocity detection value ω_s of the motor 1, and the q-axis current detection value Iq_s into Id, Vd, ω, and Iq, respectively, of the above expression (4) to calculate the inductance Lq of the q-axis armature.

The resistance R of the d-axis armature and the q-axis armature in expression (2) and expression (4) given above takes preset fixed values. The inductance Ld of the d-axis armature in expression (2) may take a preset fixed value; however, the inductance Ld of the d-axis armature decreases as a rotor phase difference increases, so that the inductance Ld may take an estimated value that causes the inductance Ld to decrease as the rotor phase difference command value θd_c increases.

Then, the rotor phase difference estimator 64 determines an estimated value θd_e of a rotor phase difference on the basis of the induced voltage constant Ke and the inductance Lq of the q-axis armature calculated by the constant calculator 63. If the rotor phase difference changes, then the induced voltage constant Ke of the motor 1 and the inductance Lq of the q-axis armature change accordingly.

Hence, the rotor phase difference estimator 64 applies the induced voltage constant Ke and the q-axis armature inductance Lq, which have been calculated by the constant calculator 63, to a correspondence map of Ke and Lq/θd shown in FIG. 7(b) to obtain an associated phase difference θd, and determines the phase difference θd as the estimated value θd_e of the phase difference between the outer rotor 12 and the inner rotor 11.

The correspondence map of Ke and Lq/θd is prepared on the basis of experimental data or computer simulations and stored in a memory (not shown) beforehand. The induced voltage constant Ke calculated by the constant calculator 63 could be applied to the Ke/θd correspondence map shown in FIG. 7(a) to determine θd_e; however, the accuracy of the estimation of a rotor phase difference can be improved by using the inductance Lq of the q-axis armature in addition to the induced voltage constant Ke to determine the estimated value θd_e of a rotor phase difference.

Then, the current command value determiner 60 applies the torque command value Tr_c and the estimated value θd_e of a rotor phase difference to a correspondence map of Tr, θd/Id, and Iq, which has been stored in a memory beforehand, to obtain associated Id and Iq, and determines the obtained Id and Iq as a d-axis current command value Id_c and a q-axis current command value Iq_c, respectively. Thus, using the estimated value θd_e of a rotor phase difference makes it possible to determine the d-axis current command value Id_c and the q-axis current command value Iq_c that reflect an actual change in a magnetic flux of a field of the motor 1. Hence, output torques of the motor 1 can be accurately controlled on the basis of the torque command value Tr_c.

Referring now to FIG. 8, an explain will be given about advantages obtained by changing a rotor phase difference, an output voltage of the DC power source 100, and the d-axis current such that a resultant vector V traces the circumference of the target voltage circle C having Vp_target as its radius when the magnitude Vp of the resultant vector V of a voltage between the terminals of the d-axis armature and a voltage between the terminals of the q-axis armature is larger than Vp_target (Vp_target<Vp).

FIG. 8(a) shows a resultant vector V that lies outside the target voltage circle C. In this case, the amount of energization of the motor 1 from the PMW calculator 62 is restricted, preventing the energization control of the motor 1. To cope with this, first processing for increasing a voltage between the terminals is carried out to change the rotor phase difference θd in the direction for reducing the magnetic fluxes of fields (in the direction for weakening fields by increasing a rotor phase difference). Thus, the induced voltage constant Ke of the motor 1 reduces and the back electromotive force E generated in the q-axis armature decreases by an amount equivalent to the reduction in the induced voltage constant Ke. As a result, the resultant vector V approaches the circumference of the target voltage circle C, as shown in FIG. 8(b).

Next, second processing for increasing a voltage between terminals is carried out to raise the output voltage Vdc of the DC power source 100. This increases Vp_target calculated by the target voltage circle calculator 90, causing the target voltage circle C to be expanded, as shown in FIG. 8(c), so that the resultant vector V further approaches the target voltage circle C.

Then, third processing for increasing a voltage between terminals is carried out to increase the d-axis current. This causes the resultant vector V to reach the circumference of the target voltage circle C, as shown in FIG. 8(d). Thus, the amount of energization of the motor 1 from the PWM calculator 62 can be increased by bringing the resultant vector V close to the target voltage circle C, making it possible to obviate the restriction on the energization control of the motor 1.

Referring now to FIG. 9, an explain will be given about advantages obtained by changing a rotor phase difference and an output voltage of the DC power source 100 such that a resultant vector V traces the circumference of the target voltage circle C having Vp_target as its radius when the magnitude Vp of the resultant vector V of a voltage between the terminals of the d-axis armature and a voltage between the terminals of the q-axis armature is smaller than Vp_target (Vp<Vp_target).

FIG. 9(a) shows a resultant vector V that lies inside the target voltage circle C. In this case, the PWM calculator 62 incurs increased power loss due to switching of the DC voltage Vdc. To cope with this, the controller carries out first processing for decreasing a voltage between the terminals so as to change the rotor phase difference θd in the direction for increasing the magnetic fluxes of fields (in the direction for strengthening fields by reducing a rotor phase difference). Thus, the induced voltage constant Ke of the motor 1 increases and the back electromotive force E generated in the q-axis armature increases by an amount equivalent to the increase in the induced voltage constant Ke. As a result, the resultant vector V approaches the circumference of the target voltage circle C, as shown in FIG. 9(b).

Next, the controller carries out second processing for decreasing a voltage between terminals so as to reduce the output voltage Vdc of the DC power source 100. This reduces Vp_target calculated by the target voltage circle calculator 90, causing the target voltage circle C to be reduced, as shown in FIG. 9(c), so that the resultant vector V further approaches the target voltage circle C and reaches the circumference of the target voltage circle C.

Thus, the power loss in the PWM calculator 62 caused by the switching of the DC voltage Vdc can be reduced by bringing the resultant vector V close to the target voltage circle C. Moreover, ripple current superimposed on the current supplied to the motor 1 is reduced with consequent reduction in copper loss produced in the motor 1. In addition, superimposition of high-frequency currents reduces, making it possible to obtain an advantage of a reduced iron loss produced in the motor 1.

Referring now to FIG. 10, an explanation will be given about the processing for controlling the operations of the induced voltage constant command value determiner 93, the DC voltage command value determiner 120, and the field weakening current correction value calculator 121 by the torque response determiner 110.

The torque response determiner 110 determines in STEP10 whether a change rate ΔTr_c (for example, calculating the change rate of Tr_c between successive control cycles of the controller) of the torque command value Tr_c is not more than a preset reference value ΔTr_limit. In the case where ΔTr_c is smaller than the ΔTr_limit (ΔTr_c<ΔTr_limit), then the torque response determiner 110 branches to STEP20 to turn on or enable all of an actuation flag F1 of the induced voltage constant command value determiner 93, an actuation flag F2 of the DC voltage command value determiner 120, and an actuation flag F3 of the field weakening current correction value calculator 121, and proceeds to STEP13.

With this setting, the first processing for increasing a voltage between terminals by actuating the induced voltage constant command value determiner 93 is carried out prior to the second processing for increasing a voltage between terminals by the DC voltage command value determiner 120, and the third processing for increasing a voltage between terminals by the field weakening current correction value calculator 121. Further, the first processing for decreasing a voltage between terminals by the induced voltage constant command value determiner 93 is carried out before the second processing for decreasing a voltage between terminals by the DC voltage command value determiner 120.

The first processing for increasing a voltage between terminals and the first processing for decreasing a voltage between terminals, which are mechanical processing that permits higher operating efficiency of a motor although it is slow in response, make it possible to control the operation of the motor 1 with priority given to operating efficiency.

Meanwhile, in the case where the change rate ΔTr_c of the torque command value Tr_c is found to be the reference value ΔTr_limit or more in STEP10, then the torque response determiner 110 proceeds to STEP11. In STEP11, the torque response determiner 110 determines whether the difference ΔVp between the magnitude Vp of the resultant vector V of the voltage between the terminals of the d-axis armature and the voltage between the terminals of the q-axis armature and the target voltage Vp_target is the preset reference value ΔVp_limit or more. If the ΔVp is larger than the ΔVp_limit, that is, if the ΔVp is small while the change rate ΔTr_c of a torque command value is large, then the torque response determiner 110 branches to STEP20 to carry out the processing in STEP20 described above and proceeds to STEP13.

Meanwhile, in the case where the ΔVp is the ΔVp_limit or more, that is, in the case where the change rate ΔTr_c of a torque command value is large and the ΔVp is also large, then the torque response determiner 110 proceeds to STEP12. The torque response determiner 110 turns off or disables the actuation flag F1 of the induced voltage constant command value determiner 93 while it turns on or enables the actuation flag F2 of the DC voltage command value determiner 120 and the actuation flag F3 of the field weakening current correction value calculator 121, then proceeds to STEP13.

With this setting, the second processing for increasing a voltage between terminals by the DC voltage command value determiner 120 and the third processing for increasing a voltage between terminals by the field weakening current correction value calculator 121 are carried out before the first processing for increasing a voltage between terminals by the induced voltage constant command value determiner 93. Further, the second processing for decreasing a voltage between terminals by the DC voltage command value determiner 120 is carried out before the first processing for decreasing a voltage between terminals by the induced voltage constant command value determiner 93.

The second processing for increasing a voltage between terminals, the third processing for increasing a voltage between terminals, and the second processing for decreasing a voltage between terminals, which are electrical processing that permits quick response, make it possible to control the operation of the motor 1 with priority given to responsiveness to a change in the torque command value Tr_c.

In the present embodiment, the level of ΔTr_c has been determined in STEP10 and the level of ΔVp has been determined in STEP11 to determine the order of execution of the first processing for increasing a voltage between terminals, the second processing for increasing a voltage between terminals, and the third processing for increasing a voltage between terminals, and to determine the order of execution of the first processing for decreasing a voltage between terminals and the second processing for decreasing a voltage between terminals. Alternatively, however, only the level of either the ΔTr_c or the ΔVp may be determined to determine the order of execution of the processing.

With reference now to FIG. 5, according to the flowchart shown in FIG. 11, an explanation will be given about the operations of the induced voltage constant command value determiner 93, the DC voltage command value determiner 120, and the field weakening current correction value calculator 121 when all the aforesaid flags F1, F2 and F3 are ON. Referring to FIG. 11, the processing in STEP30 to STEP32 and STEP40 to STEP41 is performed by the induced voltage constant command value determiner 93, and the processing in STEP32 and STEP50 to STEP51 is performed by the DC voltage command value determiner 120. The processing in STEP60 is performed by the field weakening current correction value calculator 121.

In STEP30 of FIG. 11, the induced voltage constant command value determiner 93 determines whether the ΔVp (ΔVp_target-Vp) calculated by the subtractor 91 (refer to FIG. 5) is zero or more (0≦ΔVp). If the ΔVp is smaller than zero (ΔVp<0), that is, if the resultant vector V shown in FIG. 8(a) described above is outside the target voltage circle C, then the induced voltage constant command value determiner 93 branches to STEP40.

The induced voltage constant command value determiner 93 determines in STEP40 whether the rotor phase difference command value θd_c associated with the induced voltage constant command value Ke_c calculated by proportional integration (PI) control on ΔVp is not less than a limit value θd_max (180 degrees) on the side of field weakening by the actuator 30. If θd_c is smaller than θd_max (θd_c<θd_max), then the induced voltage constant command value determiner 93 proceeds to STEP41 wherein it outputs Ke_c to the rotor phase difference acquirer 95.

The rotor phase difference acquirer 95 applies Ke_c to the Ke/θd map shown in FIG. 12 to acquire the rotor phase difference θd_c1 associated with the Ke_c. Then, the difference Δθd between the θd_c1 and θd_e calculated by the subtractor 96 is output to the rotor phase difference command value determiner 97. The rotor phase difference command value determiner 97 outputs a command value θd_c2 of the rotor phase difference determined by the PI control on the Δθd to the actuator 25.

The actuator 25 executes the processing of the flowchart shown in FIG. 13 to change the rotor phase difference of the motor 1. More specifically, upon receipt of the rotor phase difference command value θd_c2 from the rotor phase difference command value determiner 97 in STEP1 of FIG. 13, the actuator 25 converts the θd_c2 into a mechanical angle β in STEP2. Then, in the subsequent STEP3, the actuator 25 converts the mechanical angle β into an operational angle γ of the first planetary carrier C1, and rotates the first planetary carrier C1 by the operational angle γ in STEP4. This causes the rotor phase difference to be changed by the angle based on the rotor phase difference command value θd_c2, and the magnetic fluxes of the fields of the motor 1 are changed accordingly, thus executing the first processing for increasing a voltage between terminals for shifting from the state shown in FIG. 8(a) to the state shown in FIG. 8(b) described above.

Meanwhile, if θd_c is found to be the θd_max or more in STEP40, then the DC voltage command value determiner 120 branches to STEP50. The DC voltage command value determiner 120 determines in STEP50 whether the DC voltage command value Vdc_c calculated by the PI control on the ΔVp is not less than a Vdc_max, which is a maximum voltage that can be output by the DC/DC converter 101.

If the Vdc_c is smaller than the Vdc_max, then the DC voltage command value determiner 120 proceeds to STEP51 wherein it outputs the Vdc_c calculated by the PI control on the ΔVp (the Vdc_c is increased in this case) to the DC/DC converter 101, and proceeds to STEP33. This increases the output voltage Vdc of the DC power source 100, and the radius Vp_target of a target supply voltage circle calculated by the target voltage circle calculator increases accordingly. Then, the second processing for increasing a voltage between terminals for shifting from the state shown in FIG. 8(b) to the state shown in FIG. 8(c) described above is carried out.

If the Vdc_c is found to be the Vdc_max or more (Vdc_max≦Vdc_c) in STEP50, then the processing branches to STEP60. In this case, the output voltage Vdc of the DC power source 100 cannot be increased any further. Hence, the field weakening current correction value calculator 121 outputs the field weakening current correction value ΔId_vol calculated by the PI control on the difference ΔVdc between Vdc_c and Vdc_s to the adder 51. This causes the d-axis current to increase, and the third processing for increasing a voltage between terminals for shifting the state shown in FIG. 8(c) to the state shown in FIG. 8(d) described above is carried out.

Thus, if it is determined in STEP30 that the Vp is larger than the Vp_target, then the processing for bringing the Vp close to the Vp_target is carried out in the following order: the first processing for increasing a voltage between terminals→the second processing for increasing a voltage between terminals→the third processing for increasing a voltage between terminals.

Subsequently, if it is determined in STEP30 that the Vp is the Vp_target or less (the state shown in FIG. 9(a) described above), then the processing proceeds to STEP31. In STEP31, the induced voltage constant command value determiner 93 determines whether the rotor phase difference command value θd_c associated with the induced voltage constant command value Ke_c calculated by the PI control on the ΔVp is not more than a limit value θd_min (zero degree) on the side of field strengthening by the actuator 30.

If the θd_c is larger than the θd_min (θd_min<θd_c), then the processing proceeds to STEP32 wherein the induced voltage constant command value determiner 93 outputs the Ke_c to the rotor phase difference acquirer 95. This causes the rotor phase difference of the motor 1 to be changed in the same manner as that of the processing in STEP41 discussed above and the magnetic fluxes of the fields of the motor 1 increase, thus executing the first processing for decreasing a voltage between terminals for shifting from the state shown in FIG. 9(a) to FIG. 9(b) described above.

Meanwhile, if it is determined in STEP31 that the θd_c is the θd_min or less (θd_c≦θd_min), then the processing branches to STEP70. In this case, the rotor phase difference cannot be reduced any further; therefore, the DC voltage command value determiner 120 outputs the Vdc_c calculated by the PI control on the ΔVp (the Vdc_c reduced in this case) and proceeds to STEP33.

Thus, the output voltage Vdc of the DC power source 100 reduces and the radius Vp_target of the target supply voltage circle calculated by the target voltage circle calculator reduces accordingly. Then, the second processing for decreasing a voltage between terminals for shifting from the state shown in FIG. 9(b) to the state shown in FIG. 9(c) is carried out.

As described above, if it is determined in STEP30 that the Vp is the Vp_target or less, the processing for bringing the Vp close to the Vp_target is carried out in the following order: the first processing for decreasing a voltage between terminals→the second processing for decreasing a voltage between terminals.

In the present embodiment, by the processing shown in FIG. 11, the control has been conducted to bring the magnitude Vp close to the Vp_target by carrying out the first processing for increasing a voltage between terminals, the second processing for increasing a voltage between terminals, and the third processing for increasing a voltage between terminals if the Vp is larger than the Vp_target, and the control has been conducted to bring the Vp close to the Vp_target by carrying out the first processing for decreasing a voltage between terminals and the second processing for decreasing a voltage between terminals if the Vp is the Vp_target or less; however, the advantages of the present invention can be obtained also when only either one of the aforesaid controls is carried out.

Further, in the present embodiment, the field weakening current correction value calculator 121 has been provided to carry out the third processing for increasing a voltage between terminals to weaken the fields of the motor 1 by increasing the d-axis current; however, the advantages of the present invention can be obtained even if the third processing for increasing a voltage between terminals is not carried out.

In addition, in STEP11 of FIG. 10 and in STEP30 of FIG. 11, the magnitude Vp of the resultant vector V of the d-axis voltage command value Vd_c and the q-axis voltage command value Vq_c has been compared with the target voltage circle radius Vp_target. Alternatively, however, the voltages between the terminals of the armatures of the motor 1 may be detected to calculate the magnitude of the resultant vector of the voltages between the terminals of the individual phases, and the calculated magnitude of the resultant vector (corresponding to the magnitude of the resultant vector of the voltages between the terminals of the armatures of the individual phases of the motor in the present invention) and the target voltage circle radius Vp_target may be compared.

The present embodiment has shown the controller for a motor adapted to handle the motor by converting the motor into an equivalent circuit based on 2-phase DC rotating coordinate system composed of the d-axis and the q-axis. The present invention, however, can be also applied to a controller for a motor adapted to handle the motor by converting the motor into an equivalent circuit based on a 2-phase AC fixed coordinate system composed of an α-axis and β-axis or a controller for a motor adapted to handle a 3-phase AC motor as it is without converting the motor into an equivalent circuit.

What is claimed is:

1. A controller for a motor adapted to control an operation of a permanent magnet field type rotary motor having a first rotor and a second rotor, which have a plurality of fields made of permanent magnets and which are disposed around a rotating shaft, by field control carried out by changing a rotor phase difference, which is a phase difference between the first rotor and the second rotor, the controller comprising:
   an inverter circuit which converts DC power supplied from a DC power source into multiphase AC power to be supplied to an armature of the motor;
   rotor phase difference changing means which changes the rotor phase difference;
   DC voltage changing means which changes an output voltage of the DC power source; and
   voltage-between-terminals increasing means which carries out at least one of first processing for increasing a voltage between terminals to change the rotor phase difference in a direction for reducing the magnetic fluxes of fields of the motor by the rotor phase difference changing means and second processing for increasing a voltage between terminals to increase an output voltage of the DC power source by the DC voltage changing means in the case where the magnitude of a resultant vector of the voltages between terminals of armatures of individual phases of the motor exceeds a target voltage which has been set to be not more than an output voltage of the DC power source.

2. The controller for a motor according to claim 1, wherein the voltage-between-terminals increasing means carries out the first processing for increasing a voltage between terminals before the second processing for increasing a voltage between terminals in the case where the magnitude of the resultant vector of the voltages between the terminals of the armatures of the individual phases of the motor exceeds the target voltage, and thereafter carries out the second processing for increasing a voltage between terminals in the case where the magnitude of the resultant vector of the voltages between the terminals of the armatures of the individual phases of the motor remains larger than the target voltage even after the first processing for increasing a voltage between terminals is carried out.

3. The controller for a motor according to claim 1, wherein
   an operation of the motor is controlled on the basis of a predetermined torque command value, and
   the voltage-between-terminals increasing means determines the order of execution of the first processing for increasing a voltage between terminals and the second processing for increasing a voltage between terminals on the basis of a change rate of the torque command value.

4. The controller for a motor according to claim 1, wherein the voltage-between-terminals increasing means determines the order of execution of the first processing for increasing a voltage between terminals and the second processing for increasing a voltage between terminals on the basis of the magnitude of a difference between the magnitude of the resultant vector of the voltages between the terminals of the armatures of the individual phases of the motor and the target voltage.

5. The controller for a motor according to claim 1, comprising:
   rotor position detecting means which detects a position of the first rotor; and
   energization controlling means which handles the motor by converting the motor into an equivalent circuit based on a two-phase DC rotating coordinate system composed of a d-axis extending in the direction of a magnetic flux of a field and a q-axis orthogonal to the d-axis on the basis of the position of the first rotor and which controls the amount of energization of an armature disposed on each axis in the equivalent circuit thereby to control the energization of the motor, wherein
   the voltage-between-terminals increasing means carries out at least one of the first processing for increasing a voltage between terminals, the second processing for increasing a voltage between terminals, and third processing for increasing a voltage between terminals whereby to increase the amount of energization of the armature disposed on the d-axis in the energization control in the case where the magnitude of a resultant vector of the voltages between terminals of the armatures of the individual phases of the motor exceeds the target voltage.

6. The controller for a motor according to claim 5, wherein the voltage-between-terminals increasing means carries out the first processing for increasing a voltage between terminals and the second processing for increasing a voltage between terminals before the third processing for increasing a voltage between terminals in the case where the magnitude of the resultant vector of the voltages between the terminals in the motor exceeds the target voltage, and then carries out the third processing for increasing a voltage between terminals in the case where the magnitude of the resultant vector of the voltages between the terminals of the armatures of the individual phases of the motor remains larger than the target voltage even after the first processing for increasing a voltage between terminals and the second processing for increasing a voltage between terminals are carried out.

7. The controller for a motor according to claim 5, wherein an operation of the motor is controlled on the basis of a predetermined torque command value, and the voltage-between-terminals increasing means determines the order of execution of the first processing for increasing a voltage between terminals, the second processing for increasing a voltage between terminals, and the third processing for increasing a voltage between terminals on the basis of a change rate of the torque command value.

8. The controller for a motor according to claim 5, wherein the voltage-between-terminals increasing means determines the order of execution of the first processing for increasing a voltage between terminals, the second processing for increasing a voltage between terminals, and the third processing for increasing a voltage between terminals on the basis of the magnitude of a difference between the magnitude of the resultant vector of the voltages between the terminals of the armatures of the individual phases of the motor and the target voltage.

9. A controller for a motor adapted to control an operation of a permanent magnet field type rotary motor having a first rotor and a second rotor, which have a plurality of fields made of permanent magnets and which are disposed around a rotating shaft, by field control carried out by changing a rotor phase difference as the phase difference between the first rotor and the second rotor, the controller comprising:

an inverter circuit which converts DC power supplied from a DC power source into multiphase AC power to be supplied to an armature of the motor;

rotor phase difference changing means which changes the rotor phase difference;

DC voltage changing means which changes an output voltage of the DC power source; and voltage-between-terminals decreasing means which carries out at least one of first processing for decreasing a voltage between terminals to change the rotor phase difference in a direction for increasing the magnetic fluxes of fields of the motor by the rotor phase difference changing means and second processing for decreasing a voltage between terminals to reduce an output voltage of the DC power source by the DC voltage changing means in the case where the magnitude of a resultant vector of the voltages between terminals of armatures of individual phases of the motor becomes smaller than a target voltage which has been set to be not more than an output voltage of the DC power source.

10. The controller for a motor according to claim 9, wherein the voltage-between-terminals decreasing means carries out the first processing for decreasing a voltage between terminals before the second processing for decreasing a voltage between terminals in the case where the magnitude of the resultant vector of the voltages between the terminals of the armatures of the individual phases of the motor becomes smaller than the target voltage, and then carries out the second processing for decreasing a voltage between terminals in the case where the magnitude of the resultant vector of the voltages between the terminals of the armatures of the individual phases of the motor remains smaller than the target voltage even after the first processing for decreasing a voltage between terminals is carried out.

11. The controller for a motor according to claim 9, wherein an operation of the motor is controlled on the basis of a predetermined torque command value, and the voltage-between-terminals decreasing means determines the order of execution of the first processing for decreasing a voltage between terminals and the second processing for decreasing a voltage between terminals on the basis of a change rate of the torque command value.

12. The controller for a motor according to claim 9, wherein the voltage-between-terminals decreasing means determines the order of execution of the first processing for decreasing a voltage between terminals and the second processing for decreasing a voltage between terminals on the basis of the magnitude of a difference between the magnitude of the resultant vector of the voltages between the terminals of the armatures of the individual phases of the motor and the target voltage.

* * * * *